US011855849B1

United States Patent
Davis et al.

(10) Patent No.: US 11,855,849 B1
(45) Date of Patent: Dec. 26, 2023

(54) ARTIFICIAL INTELLIGENCE BASED SELF-ORGANIZING EVENT-ACTION MANAGEMENT SYSTEM FOR LARGE-SCALE NETWORKS

(71) Applicant: Amazon Technologies, Inc., Seattle, WA (US)

(72) Inventors: Melissa Elaine Davis, Edmonds, WA (US); Renaud Bordelet, Dublin (FR); Charles Alexander Carman, Seattle, WA (US); David Elfi, Bothell, WA (US); Anton Vladilenovich Goldberg, San Jose, CA (US); Kyle Bradley Peterson, Seattle, WA (US); Christopher Allen Suver, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 1175 days.

(21) Appl. No.: 15/716,201

(22) Filed: Sep. 26, 2017

(51) Int. Cl.
*H04L 41/12* (2022.01)
*G06N 20/00* (2019.01)
*G06N 5/046* (2023.01)
*H04L 67/12* (2022.01)

(52) U.S. Cl.
CPC .......... *H04L 41/12* (2013.01); *G06N 5/046* (2013.01); *G06N 20/00* (2019.01); *H04L 67/12* (2013.01)

(58) Field of Classification Search
CPC ................................. H04L 41/12; G06N 20/00
See application file for complete search history.

(56) References Cited

U.S. PATENT DOCUMENTS

| | | | |
|---|---|---|---|
| 6,697,791 B2 | 2/2004 | Hellerstein et al. | |
| 2002/0073195 A1* | 6/2002 | Hellerstein | H04L 41/0631 709/224 |
| 2004/0073764 A1* | 4/2004 | Andreasson | G06F 12/0253 711/170 |
| 2006/0294238 A1* | 12/2006 | Naik | H04L 41/044 709/226 |
| 2007/0124081 A1* | 5/2007 | Noguchi | G16B 20/00 702/19 |

OTHER PUBLICATIONS

Mi et al, "Online Self-reconfiguration with Performance Guarantee for Energy-efficient Large-scale Cloud Computing Data Centers", 2010, IEEE 37th International Conference on Service Computing, pp. 514-521. (Year: 2010).*

(Continued)

*Primary Examiner* — Alexey Shmatov
*Assistant Examiner* — Clint Mullinax
(74) *Attorney, Agent, or Firm* — Robert C. Kowert; Kowert, Hood, Munyon, Rankin & Goetzel, P.C.

(57) ABSTRACT

At a rule processing unit of an evolving, self-organized machine learning-based resource management service, a rule of a first rule set is applied to a value of a first collected metric, resulting in the initiation of a first corrective action. A set of metadata indicating the metric value and the corrective action is transmitted to a repository, and is used as part of an input data set for a machine learning model trained to generate rule modification recommendations. In response to determining that the corrective actions did not meet a success criterion, an escalation message is transmitted to another rule processing unit.

20 Claims, 11 Drawing Sheets

(56) References Cited

OTHER PUBLICATIONS

Burrett et al, "Applying reinforcement learning towards automating resource allocation and application scalability in the cloud", 2012, Concurrency and Computation: Practive and Experience, Wiley Online Library, pp. 1-19. (Year: 2012).*

Farahnakian et al, "Hierarchical VM Management Architecture for Cloud Data Centers", 2014, IEEE 6th International Conference on Cloud Computing Technology and Science, pp. 306-311. (Year: 2014).*

Lakshmi et al, "Proactive and Adaptive Data Migration in Hierarchical Storage Systems using Reinforcement Learning Agent", 2014, International Journal of Computer Applications, vol. 94, pp. 46-52. (Year: 2014).*

Peng et al, "A Study of a Multi-Agent Organizational Framework with Virtual Machine Clusters as the Unit of Granularity in Cloud Computing", 2016, The Computer Journal, vol. 60, Issue 7, pp. 1032-1043. (Year: 2016).*

Liu et al, "A Hierarchical Framework of Cloud Resource Allocation and Power Management Using Deep Reinforcement Learning", Jul. 2017, IEEE 37th International Conference on Distributed Computing Systems, pp. 372-382. (Year: 2017).*

Liu et al, "A Hierarchical Framework of Cloud Resource Allocation and Power Management Using Deep Reinforcement Learning", 2017, 2017 IEEE 37th International Conference on Distributed Computing Systems, pp. 372-382. (Year: 2017).*

U.S. Appl. No. 14/274,477, filed May 29, 2014, Upendra Bhalchandra Shevade, et al.

U.S. Appl. No. 13/528,271, filed Jun. 20, 2012, Long X. Nguyen.

Hongzi Mao, et al., "Resource Management with Deep Reinforcement Learning," HotNets-XV, Nov. 9-10, 2016, Atlanta, GA, USA, (c)2016 ACM. ISBN 978-1-4503-4661-0/16/11, DOI: http://dx.doi.org/10.1145/3005745.3005750, pp. 1-7.

Amazon Web Services, "Amazon Machine Learning; Developer Guide," Version Latest downloaded Sep. 5, 2017, pp. 1-152.

Amazon Web Services, "Amazon EC2 Systems Manager; User Guide," Version Latest downloaded Sep. 5, 2017, pp. 1-287.

\* cited by examiner

US 11,855,849 B1

ARTIFICIAL INTELLIGENCE BASED SELF-ORGANIZING EVENT-ACTION MANAGEMENT SYSTEM FOR LARGE-SCALE NETWORKS

BACKGROUND

Many companies and other organizations operate large-scale computer networks that interconnect numerous computing systems to support their operations, such as with the computing systems being co-located (e.g., as part of a local network) or instead located in multiple distinct geographical locations (e.g., connected via one or more private or public intermediate networks). For example, data centers housing significant numbers of interconnected computing systems have become commonplace, such as private data centers that are operated by and on behalf of a single organization, and public data centers that are operated by entities as businesses to provide computing resources to customers. In many cases, a given data center may house thousands of servers and other devices (with associated firmware and software stacks) whose configuration and status have to be managed, and a given network may include the resources of numerous data centers.

The advent of virtualization technologies for commodity hardware has provided benefits with respect to managing large-scale computing resources for many customers with diverse needs, allowing various computing resources to be efficiently and securely shared by multiple customers. For example, virtualization technologies may allow a single physical virtualization host to be shared among multiple users by providing each user with one or more "guest" virtual machines hosted by the single virtualization host. Each such virtual machine may represent a software simulation acting as a distinct logical computing system that provides users with the illusion that they are the sole operators of a given hardware computing resource, while also providing application isolation and security among the various virtual machines. Instantiating several different virtual machines on the same host may also help increase the overall hardware utilization levels at a data center, leading to higher returns on investment. The use of virtualization can also, however, lead to an even greater increase in the total number of logical computing elements that have to be managed by the organization responsible for providing and maintaining the computing infrastructure.

All the different types of virtual and physical elements of a large computing environment may have associated sets of metrics, generated at various layers of the hardware/software stack, indicative of the current states of the elements. Very large volumes of metric and event data may potentially be produced even in the space of a few hours at such environments. Analyzing such data in a timely fashion, such that undesirable events like correlated failures can be prevented or rapidly brought under control, remains a non-trivial technical challenge.

Figure 1:
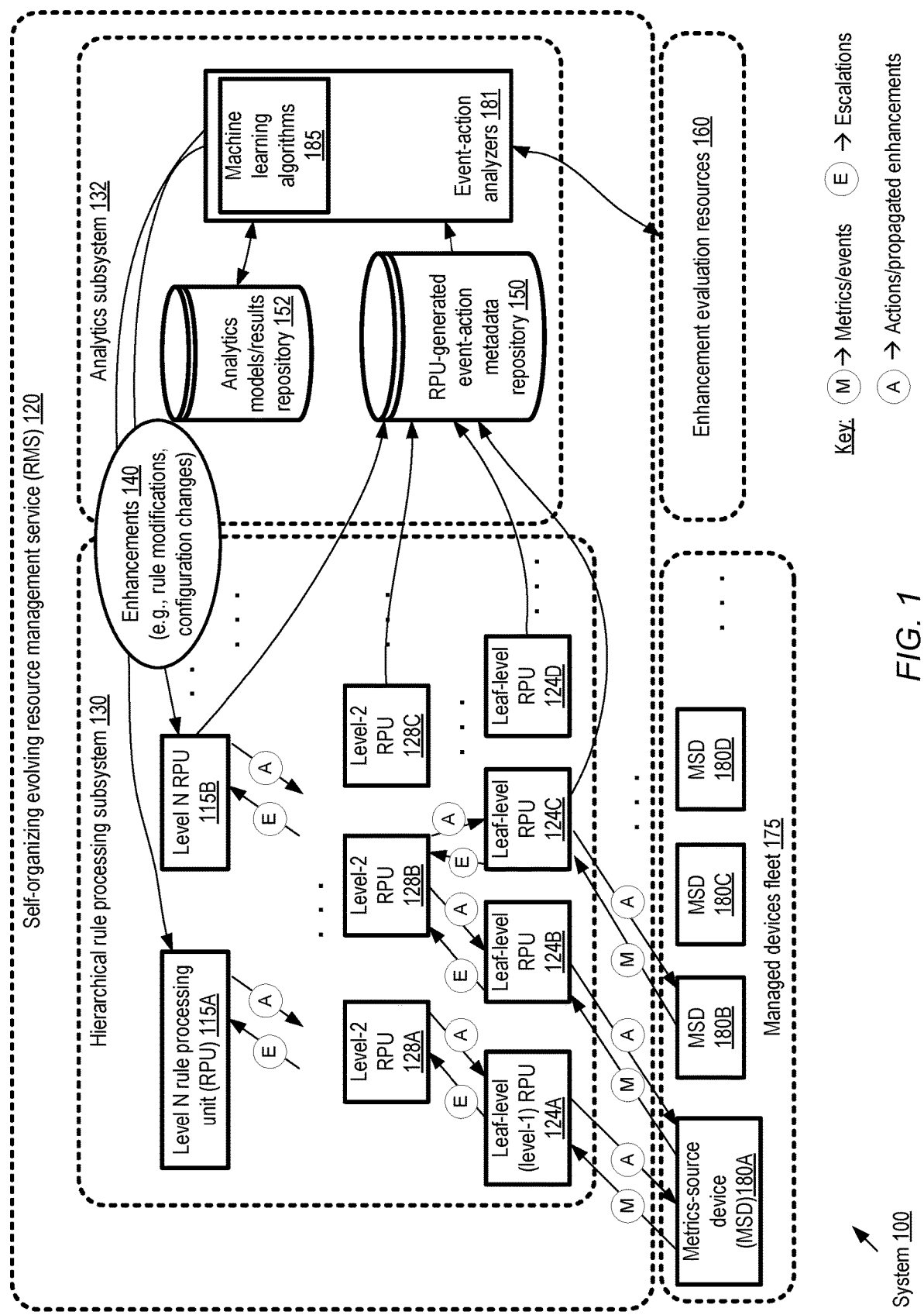
FIG. 1 illustrates an example system environment in which self-organizing evolving resource management techniques may be implemented using a hierarchy of rule processing units in combination with machine learning based analytics, according to at least some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to. When used in the claims, the term "or" is used as an inclusive or and not as an exclusive or. For example, the phrase "at least one of x, y, or z" means any one of x, y, and z, as well as any combination thereof.

DETAILED DESCRIPTION

Various embodiments of methods and apparatus for managing large-scale networks using self-organizing and evolving artificial intelligence-based techniques and a hierarchy of rule processing units are described. According to some embodiments, a resource management service or system may comprise at least two high-level subsystems: a collection of rule processing units (RPUs), and an analytics subsystem. At a high-level, the rule processing units may collectively be responsible in various embodiments for responding rapidly (e.g., at speeds which are potentially orders of magnitude faster than would have been possible if manual intervention were required) to events and metrics obtained from a potentially large fleet of hardware and software devices of a network, using respective sets of rules propagated to the individual rule processing units. One of the goals of the rule processing may comprise dampening perturbations to desired equilibrium conditions within the fleet while the perturbations remain small and contained, prior to adverse interference with higher level functionality. The analytics subsystem may be responsible in various embodiments for using machine learning models to analyze records of the events/metrics and corresponding actions taken by the rule processing units, identifying enhancements to the rules being implemented at the RPUs, the configuration of the rule processing units and/or the configurations of the devices being managed, and propagating the enhancements to the RPUs. The analytics subsystem may for example evaluate and modify weights associated with various metrics and events at the rule processing subsystem, compare and contrast various types of anomaly responses, test configuration variants and so on in some embodiments, and pass on the results of its analysis and experiments to the rule processing subsystem as recommendations or directives.

As such, information may be transferred in an ingoing flow between the two subsystems in such embodiments: the RPUs generating metadata that in effect indicates the current state of the systems being managed in accordance with a current set of rules, and the analytics subsystem processing the metadata to generate recommendations for improved rules and configurations. Gradually, the resource management service as a whole may evolve in accordance with a set of targeted overall objectives, such as reducing the response times for responding to unusual/undesirable events, reducing the rates of application or device failures, improving performance and resource utilization levels, reducing the rate at which unnecessary remediation actions are taken, and so on. In at least some embodiments, the resource management service may automatically scale as the size of the managed fleet of computing devices grows—e.g., new rule processing units and/or new event-action analyzers may be instantiated as needed based on configuration adaptation logic implemented at the analytics subsystem.

It is noted that as used herein, the terms "event" or "observation" may be used generally to refer to detections of state changes, as well as to collections of values of various metrics. The value of a given metric may be sampled from a continuous numerical distribution, a discrete numerical distribution or a categorical distribution in various embodiments. Metrics may also include values of configuration settings in at least some embodiments. Depending on whether a change in the value of a metric has occurred relative to a previous value of the metric, the collection of a metric value may itself indicate a state change. Thus, one event or observation could comprise, for example, determining that the average CPU utilization of a processor during the last 15 seconds was 45%; another observation could comprise determining that a positive acknowledgement to a heartbeat message has been received; another observation could comprise detecting that the heap size of a particular virtual machine is set to G gigabytes; another observation could comprise determining that the color of a visual state indicator of a device (which can be green, yellow or red) is green, while yet another observation could comprise the determination that an entry containing the phrase "Process terminated" appeared in a log file.

The rule processing units or RPUs may be organized in a hierarchy comprising a plurality of layers in various embodiments, including a leaf-level layer and one or more non-leaf-level layers. Respective rule sets (which may be dynamically modified over time based on operations performed at the analytics subsystem using machine learning) may be transmitted to or obtained at each RPU. At the lowest level of the RPU hierarchy, in at least some embodiments a given leaf-level RPU may be configured to collect and respond to only a particular type of metric or event signal of a particular monitored component of the fleet; as a result, the logic that has to be implemented at a given leaf-level RPU may be fairly straightforward. In other embodiments, a given leaf-level RPU may be responsible for responding to values of more than one metric. The arrangement and communications among RPUs at different levels may be considered roughly analogous to the sparse distributed representation (SDR) model of information processing and flow within human brains (and other similar brains) in various embodiments. As mentioned earlier, in various embodiments, the rule sets of the leaf-level RPUs may be designed so as to dampen undesired perturbations of system behavior using localized response actions as far as possible, and to notify a non-leaf level RPU via an escalation mechanism only when the localized response actions fail to control the undesired behaviors. In some embodiments, a rule set may comprise a sequential chain of individual rules with associated local actions, with successor actions of the chain being initiated only if earlier actions of the chain fail to rectify some anomalous or unusual condition, terminating in a rule which leads to an escalation if a desired result is not achieved with respect to the specific metric or event for which the rule chain is being applied.

For example, consider a simple scenario in which a leaf-level RPU $RPU_1$ obtains observations of a particular metric $M_i$ from some computing device (e.g., using one or more sensors). In this example scenario, in accordance with the current rule set $RS_1$ deployed at $RPU_1$, $M_i$ is considered to be in a desirable or stable range if its value (assumed to be a numeric value in this example) lies in the range $V_{min}$-$V_{max}$. Assume further than $RS_1$ comprises a chain of two rules $R_1$ followed by $R_2$. Upon obtaining a particular value of $M_i$, a determination may be made at $RPU_1$ as to whether the value lies in the acceptable range. If the value is acceptable, the value may be recorded (further details regarding how and where metrics are recorded are provided below), and no immediate actions need be taken at $RPU_1$ until, after some interval, another value of $M_i$ is sampled. If the value is not acceptable, a corrective action $A_1$ indicated in $R_1$ may be taken, and the value of $M_i$ may be sampled again after some interval (e.g., using a sensor probe mechanism). If the new value obtained after the correction action $A_1$ also does not meet the acceptance criterion, a second corrective action $A_2$ indicated in $R_2$ may be initiated, and its effect on $M_i$ may again be determined by obtaining another updated value. If the post-A2 value also is unsatisfactory, an escalation message indicating the status of $M_i$ may be transmitted from the leaf level RPU $RPU_1$ to one or more non-leaf-level RPUs. At a given non-leaf RPU, such messages from lower-level RPUs may be evaluated in combination, e.g., to determine which additional actions (if any) should be initiated, based on a rule set that was propagated earlier to the non-leaf RPU. If a decision to initiate an action is made at the non-leaf-level RPU, the decision may be propagated down to one or more leaf-level RPUs for implementation. A similar approach emphasizing local control over managed devices or over some set of descendant RPUs, with escalations towards higher-level RPUs being initiated only when local rules fail, may be employed at various layers of the RPU hierarchy in various embodiments.

In at least some embodiments, an RPU (regardless of its level in the hierarchy) may be configured to generate metadata about events it has detected and responsive actions, in accordance with a metadata formatting methodology which results in globally unique immutable identifiers being assigned for the different events and actions (and/or for event-action combinations). In at least one embodiment, different metadata formatting methodologies may be enforced at respective layers of the RPU hierarchy—e.g., metadata need not be formatted in the same way at each level. The sets of metadata generated at the RPUs may be transmitted for storage at a repository accessible by the analytics subsystem in various embodiments. In some embodiments, a respective set of metadata may be generated, transmitted and stored for each event (e.g., each metric collection) detected at an RPU; in other embodiments, a consolidated set of metadata may be generated, transmitted and stored for multiple events or for the execution of an entire rule set.

The analytics subsystem may comprise one or more event-action analyzers in some embodiments, each implemented at one or more computing devices. An event-action analyzer may utilize one or more machine learning models and/or other mathematical/statistical tools to determine any of various types of enhancements for the resource management service itself (such as rule modifications, changes to the RPU hierarchy or configuration, and so on) and/or the computing devices being managed with the help of the resource management service in some embodiments. In other embodiments, the analytics subsystem may not necessarily be permitted to initiate configuration changes of monitored devices, and may be limited to modifying rule sets or other aspects of RPUs. In such embodiments, recommendations to change monitored/managed device configurations may be transmitted to one or more other services for implementation, such as to a fleet inventory management service or a provisioning service. In one embodiment, an input data set comprising metadata generated by one or more RPUs during some time interval may be identified for a machine learning model by an event-action analyzer. The output produced by the machine learning models may be used to determine one or more rule modification recommendations for a set of RPUs, which may be then be propagated to the RPUs. In other embodiments, based on the results of the machine learning models, one or more new RPUs may be instantiated, existing RPUs may be decommissioned, the allowed pathways of communication among groups of RPUs may be modified, and so on. In some embodiments, the recommendations of the analytics subsystem may comprise assigning conditional weights to one or more metrics at the RPUs—e.g., based on a high-level workload measure, or based on a detected network traffic state, the relative importance of some metric may be lowered or raised with respect to the need for corrective actions. The event-action analyzers may implement a variety of configuration exploration and evaluation methodologies in various embodiments, such as A/B testing, blue/green testing, and so on, before propagating proposed changes to a production managed environment.

A wide variety of hardware and software devices and entities may be monitored and managed with the help of RPUs in different embodiments, including for example physical hosts, virtual machines, software containers, application processes, network devices, storage devices, and the like. The metrics or observations collected at a given leaf-level RPU may depend on the type of device being monitored in various embodiments, and may for example include CPU metrics (e.g., CPU utilization, number of threads running, user-versus-system CPU usage breakdown, etc.), storage metrics (e.g., average response times and sizes for reads/writes, storage device utilizations, queue lengths, seek times, and the like), network metrics (e.g., packet drop rates, packet sizes, total bytes transferred in/out, etc.), and/or various metrics associated with software objects or applications (e.g., buffer sizes, number of database queries handled, and the like). In some embodiments, business-related metrics (such as the expenses incurred for some set of applications or resources by an organization, the revenues/profits generated, the return on investment and so on) may also be collected and analyzed at the resource management service; that is, not all the metrics monitored and processed need necessarily be associated directly with computing devices as such. In at least one embodiment, the resource management service may implement one or more programmatic interfaces (such as a set of application programming interfaces or APIs, a web-based console, command-line tools, graphical user interfaces or the like) which can be used to clients to indicate application metrics which should be monitored, acceptable value ranges of such metrics, and so on. Any combination of numerous types of machine learning models may be used at the analytics subsystem in different embodiments, such as regression models (including linear and logistic regression), classification models, time series models and the like. In at least one embodiment, deep neural network (DNN) models may be employed.

According to at least one embodiment, when a rule modification is identified at the analytics subsystem, it may first be tried out or evaluated using resources instantiated in a controlled environment, before it is deployed to a production environment where its impact may be felt by external clients or customers of the production applications. A test configuration within an evaluation (non-production) network may be used to verify, under various workload conditions, that the result of applying the proposed rule modification meets one or more success criteria, before the modifications are deployed to the production environment. The success criteria may, for example, involve ensuring that the direction in which one or more metrics are changed as a result of changing the rules in the proposed manner is an acceptable direction—e.g., that the rule change results in reducing a metric whose value should be lower than previously measured, or increasing the value of a metric whose value should be higher.

RPUs may be implemented using a variety of techniques in different embodiments. In some embodiments, for example, an agent process comprising one or more threads of execution may be instantiated at a given computing device, and multiple RPUs (potentially including leaf-level as well as non-leaf-level RPUs) may be implemented at a given agent process. The mapping between RPUs, processes, threads and hardware devices may vary depending on the nature of the metrics or events that are to be processed, and/or the rates at which the metrics/events are to be sampled in various embodiments. In some cases the mappings be modified as a result of recommendations generated at the analytics subsystem. For example, multiple agent processes (each incorporating one or more RPUs) may be instantiated on some servers at which metrics are generated at the rate of thousands of values per minute, while a single agent may suffice for a small storage device.

Example System Environment

FIG. 1 illustrates an example system environment in which self-organizing evolving resource management techniques may be implemented using a hierarchy of rule processing units in combination with machine learning based analytics, according to at least some embodiments. As shown, system 100 may comprise various components of a self-organizing evolving resource management service (RMS) 120, organized at a high level into two subsystems: a hierarchical rule processing subsystem 130 and an analytics subsystem 132. The hierarchical rule processing subsystem 130 may comprise a collection of rule processing units (RPUs) arranged in a hierarchy, with a plurality of leaf-level or level-1 RPUs 124 (e.g., RPUs 124A-124D) and a plurality of non-leaf-level RPUs. The total number of layers (N) of RPUs in the hierarchy may vary in different embodiments, and may be modified dynamically as needed in at least some embodiments, e.g., based on decisions or recommendations made at the analytics subsystem 132. A given RPU at any of the levels (such as one of the leaf-level RPUs 124, level-2 RPUs 128, or level N RPUs 115) may be implemented at one or more computing devices in various embodiments, and may be programmed to implement a set of rules. Initial rule sets for the different RPUs may be distributed or propagated during setup of the hierarchical rule processing subsystem 130 in some embodiments, and rule sets may be modified or enhanced over time in various ways based on recommendations generated at the analytics subsystem 132.

A given RPU may respond to received signals or messages in accordance with its current rule set. Depending on the configuration of the hierarchy, signals at a particular RPU may be received from one or more lower-level RPUs (if any), from a set of sensors associated with a managed fleet 175 of computing devices (in the case of leaf-level RPUs), from higher-level RPUs (if any), and/or in some cases from a set of sibling RPUs at the same level as the particular RPU. In FIG. 1, only a subset of the kinds of signal transmissions that may occur in various embodiments is depicted; for example, signals directed at sibling RPUs are not shown to avoid clutter.

As indicated in the key shown in FIG. 1, signals comprising observations or sampled metric values (denoted by circles labeled "M") may be received from sensors at metrics source devices (MSDs) 180 at leaf-level RPUs 124 in the depicted embodiment, and the receiving of such a signal may constitute an event for which the receiving RPU generates a metadata record. Upon receiving a metrics value, a leaf-level RPU 124 may apply a rule of its rule set to the value, and determine if a corrective or responsive action is to be taken. In some cases, for example if the value is within a stable or acceptable range for the metric, no action may be necessary in at least some embodiments (although the metadata indicating that the value was received may still be generated and transmitted to a repository 150 in at least some embodiments). If the rule causes an action to be initiated, a signal or message (denoted using circles labeled "A" in FIG. 1) may be transmitted from the leaf-level RPU to the appropriate metrics source device 180. Any of a number of different types of corrective actions may be attempted in different embodiments, such as for example changing the maximum rate at which work requests of a specified type are to be accepted at the MSDs, restarting a process or thread, restarting a host, increasing/decreasing memory allocated for a certain type of task, increasing/decreasing minimum wait times between certain types of operations, and so on. In some embodiments, a rule may trigger an action which increases (or decreases) the level of detail of monitoring (locally or globally) a set of metrics, e.g., based on one or more leading indicators. This may be considered an optimization of the core monitoring functionality of the service—in effect, implementing such a rule may represent monitoring a metric relatively crudely until the metric gets close enough to a threshold that closer scrutiny is required. The level of detail may be changed, for example, by changing the frequency at which the metric is collected, by changing the precision of numeric values that are collected, by using a different tool or sensor to collect the metric, and so on. In various embodiments, the action requests may be directed to actuators (e.g., software and/or hardware components with the appropriate credentials to perform the requested actions) instantiated at the MSDs 180 of fleet 175. The mappings between RPUs and processes/threads may vary in different embodiments. For example, in one embodiment, a given RMS agent process or thread instantiated at a computing device (which may be the same computing devices from which one or more metrics are to be collected) may implement numerous RPUs.

After a given action is initiated at a leaf-level RPU 124, in at least some embodiments the leaf-level RPU may wait for some selected time interval for the action to take effect, and then issue a probe to the MSD to which the action was directed to obtain a new value of the metric. If the first action is successful (based on success criteria indicated in the rule), e.g., if the metric value is brought into an acceptable value range by the action, no additional action may be required in at least some embodiments. If the first action is unsuccessful, some follow-on operation may be performed at the leaf-level RPU in at least some embodiments, with the nature of the follow-on operation dependent on the rule set. In some embodiments, a rule set deployed at an RPU may comprise a sequence of rules, with corresponding actions, indicating successive actions which are to be implemented if the earlier actions do not succeed; an example of such a sequence is discussed in further detail below. If none of the actions indicated in the rule set of a leaf-level RPU 124 succeed, in at least some embodiments, an escalation message or signal (indicated by circles labeled "E") may be transmitted to one or more higher-level RPUs, such as a level-2 RPU 128 in the depicted embodiment, indicating the failure of the local actions.

At a given non-leaf RPU such as a level-2 RPU 128 or a level-N RPU 115, escalation messages (if any) may be collected from some number of child RPUs, e.g., based on the rule set deployed at the given non-leaf RPU. A similar approach to that taken with respect to MSDs at leaf-level RPUs may be taken with respect to child RPUs at a non-leaf RPU in the depicted embodiment. One or more higher-level actions may be initiated from a given non-leaf-level RPU, e.g., by transmitting action messages down the hierarchy to the leaf-level RPUs and eventually to the MSDs 180. If these higher-level actions are insufficient in resolving the problem indicated by the corresponding escalation message, a new escalation message may be transmitted upwards in the hierarchy, and so on. In at least some embodiments, higher-level RPUs may be responsible for managing resources organized by common function, location, region or geography—e.g., if the managed devices fleet 175 is spread over D data centers or D different geographical regions, D different N-level RPUs may be configured, one for each data center or region. In at least some embodiments, the rule sets for RPUs may be designed such that the resource management system does not over-react to apparent problem states identified at the managed devices fleet 175 which are transient in nature (or in some cases are false alarms) Tunable delays may be built in to the rule sets to avoid taking potentially disruptive actions (such as restarting processes or rebooting devices) too quickly in various embodiments. The rule sets for higher-level RPUs may, in at least some embodiments, comprise more complex logic (e.g., including more branches, asynchronous operations, and/or a wider set of inputs and outputs) than the rule sets for leaf-level RPUs, as the leaf-level RPUs may be intended to respond to events extremely rapidly (e.g., at nanosecond granularity). In some embodiments, to help prevent oscillations in the responses to various types of events, fuzzy logic (or hysteresis loops in the response, which may be logically equivalent to the fuzzy logic) may be employed, e.g., at higher-level RPUs and/or at the analytics subsystem.

It is noted that although communications or messages are shown being transmitted vertically (upwards or downwards) in the hierarchy of rule processing subsystem 130 in FIG. 1, some types of messages may be transmitted horizontally in various embodiments. For example, an action taken in response to a particular metric value may comprise transmitting a workload change request from one metrics-source device (e.g., a server at which work requests are being processed) to another metrics-source device (e.g., a load balancer which directs work requests to the server). In some embodiments, depending on the specifics of the rules being enforced, messages may be exchanged among RPUs at a given level of the hierarchy.

In various embodiments, respective sets of metadata may be generated at each RPU in response to a respective received signal, and stored at a repository 150 accessible at the analytics subsystem. The methodology used to generate the metadata, which may include a way of uniquely identifying each event (or each event in combination with a corresponding action), is discussed below in further detail. In some embodiments, metadata may be generated and transmitted to the repository not only when events occur (such as when new values of metrics are obtained at leaf-level RPUs) and actions are initiated at the managed devices fleet 175, but also when messages (such as escalation messages or messages indicating rule modifications) are transmitted from one RPU to another. As a result, the metadata repository 150 may contain reasonably complete records of resource management-related operations in various embodiments.

In the depicted embodiment, the analytics subsystem 132 may comprise a number of event-action analyzers 181, each implemented at one or more computing devices. The event-action analyzers may identify, from the sets of metadata stored at repository 150, input data sets for models implementing one or more machine learning algorithms 185 to be used to identify potential enhancements 140 to the rule processing subsystem 120. Because the analytics subsystem may have access to very large volumes of collected metadata records in at least some embodiments, the event-action analyzers may be able to perform correlation analysis using machine learning models or other statistical tools to determine which particular sets of metrics are most influential with respect to causing different types of perturbations under various system environmental conditions, and/or which types of actions are best at containing the perturbations in such conditions. The machine learning models, along with their results and other artifacts, may be stored in a separate repository 152 in some embodiments. Any of a number of different types of models may be used singly or in combination in different embodiments, including linear models (e.g., linear regression or logistic regression models), non-linear models (such as deep neural network models and the like), time series models, decision-tree based models (such as random forest models), and so on.

Various types of enhancements 140 may be identified in the depicted embodiment, such as recommended rule modifications for one or more RPUs (which may in turn involve conditional weight assignments to various metrics whose values are processed in the rules), other changes to the configuration of the hierarchy 130 and/or to the configuration of the managed device fleet 175, and so on. In at least one embodiment, the granularity and/or contents of the RPU-generated metadata reporting requirements may be modified dynamically based on analysis performed at the analytics subsystem—e.g., if, over some time interval, a particular type of event does not influence any enhancement decisions made at the analytics subsystem, a directive to stop reporting that type of event may be transmitted to the RPU hierarchy. In some embodiments, separate machine learning models may be used for each of the types of enhancements, while in other embodiments a single machine learning model may be employed for generating various types of enhancements. The enhancements 140 recommended or identified by the analytics subsystem 132 may be propagated down the hierarchy to the targeted RPUs in the depicted embodiment. In various embodiments, the effectiveness of at least some of the proposed enhancements identified at the analytics subsystem 132 may be evaluated using one or more pools of evaluation resources 160 prior to the deployment of the enhancements to the managed devices fleet.

Provider Network Environment

Figure 2:
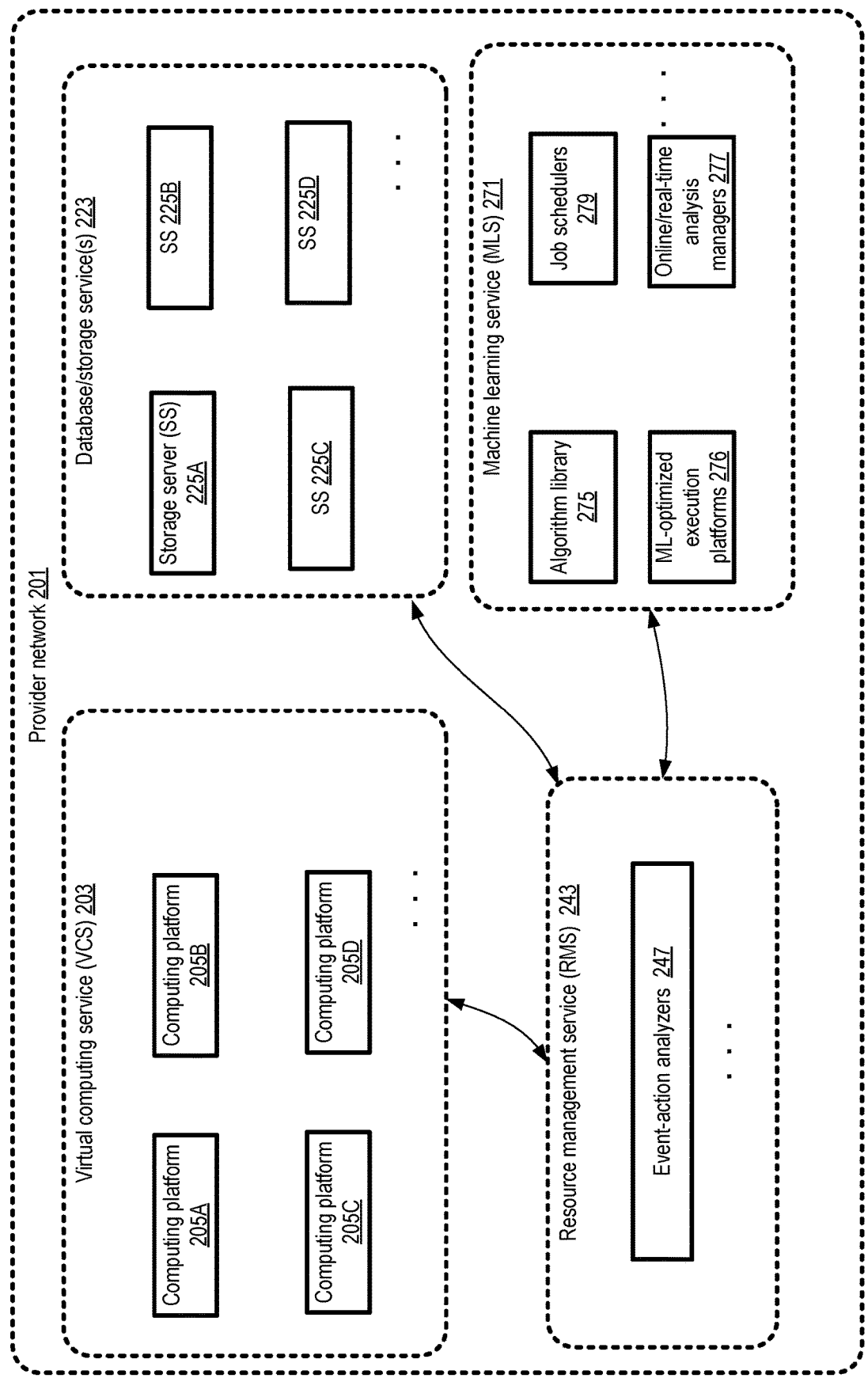
FIG. 2 illustrates an example provider network environment in which a self-organizing resource management service may be implemented, according to at least some embodiments.

In some embodiments, the techniques discussed above for event-action management may be implemented at a network-accessible service. FIG. 2 illustrates an example provider network environment in which a self-organizing resource management service may be implemented, according to at least some embodiments. Networks set up by an entity such as a company or a public sector organization to provide one or more network-accessible services (such as various types of cloud-based computing, storage or analytics services) accessible via the Internet and/or other networks to a distributed set of clients may be termed provider networks in one or more embodiments. A provider network may sometimes be referred to as a "public cloud" environment. The resources of a provider network may in some cases be distributed across multiple data centers, which in turn may be distributed among numerous geographical regions (e.g., with each region corresponding to one or more cities, states or countries). In some cases, a provider network may comprise hundreds of thousands, or even millions, of managed devices.

In the depicted embodiment, provider network 201 may comprise resources used to implement a plurality of services, including for example a virtual computing service (VCS) 203, one or more database or storage service 223, a machine learning service (MLS) 271 and a resource management service (RMS) 243. Components of a given service may utilize components of other services in the depicted embodiment—e.g., for some machine learning tasks, a component of the machine learning service 271 may utilize virtual machines implemented at computing platforms such as 205A-205D of the virtualized computing service. A number of different types of virtualization techniques may be implemented at the VCS 203, as discussed below in further detail, including the use of software containers, guest virtual machines and the like. Input data, intermediate results, final results and/or other artifacts of various machine learning algorithms or models, such as those used for identifying rule modifications or other enhancements to the RMS 243, ICEs may be stored at storage servers 225 (e.g., 225A-225D) of the database or storage service 223 in some embodiments. Individual ones of the services shown in FIG. 2 may implement a respective set of programmatic interfaces 277 which can be used by external and/or internal clients (where the internal clients may comprise components of other services) in the depicted embodiment.

As shown, the resource management service 243 may comprise, among other components, one or more event-action analyzers 247 in the depicted embodiment. The RPUs of the RMS 243 may be distributed among the devices of various other services, such as the VCS 203, storage/database services 223 and so on. The event-action analyzers 247 may, for example, invoke algorithms selected from the machine learning algorithm library 275 to train and/or execute one or more models required to analyze event-action metadata generated by RPUs in the depicted embodiment. In some embodiments, requests to train some types of machine learning models may be handled as batch jobs at the machine learning service, and a batch job scheduler 279 may orchestrate the allocation of resources for the jobs as well as dependencies among jobs. In the depicted embodiment, online/real-time analysis managers 277 of the MLS 271 may be responsible for executing some types of algorithms used to explore the effectiveness of RPU rule sets. In at least one embodiment, a machine learning service 271 may have access to or include a set of execution platforms 276 that are optimized for machine learning tasks (e.g., platforms that have customized hardware such as GPU arrays and/or customized software stacks). Depending on the suitability of such platforms for tasks involving the analysis of event-action metadata, one or more execution platforms 276 may be employed by the RMS in the depicted embodiment.

In some embodiments, two kinds of relationships may exist between the RMS and other services of the provider network 201. First, the RMS may be responsible for managing the configurations of various constituent devices of one or more other services—e.g., the managed devices fleet of the RMS may comprise computing platforms 205, storage servers 225, and so on. Second, portions or all of the RMS's operations may themselves be implemented using resources of one or more services—e.g., at least some event-action analyzers may be run using VCS 203, the repositories of metadata generated by the RPUs may be stores at a storage service 223, and so on.

In at least some embodiments, the techniques for analyzing event-action metadata and identifying recommended enhancements of the kinds described above may be implemented without acquiring resources of network-accessible services such as those shown in FIG. 2. For example, a standalone tool implemented at one or more computing devices which are not part of a network-accessible service may be used in one embodiment. Furthermore, the techniques for event-action analysis and evolutionary improvement of resource management may not necessarily be applied to the device fleets of a provider network in some embodiments. In one embodiment, the techniques may be implemented within a data center which is owned by an organization which does not provide network-accessible services to external customers, for example.

Example Sources of Metrics and Events

Figure 3:
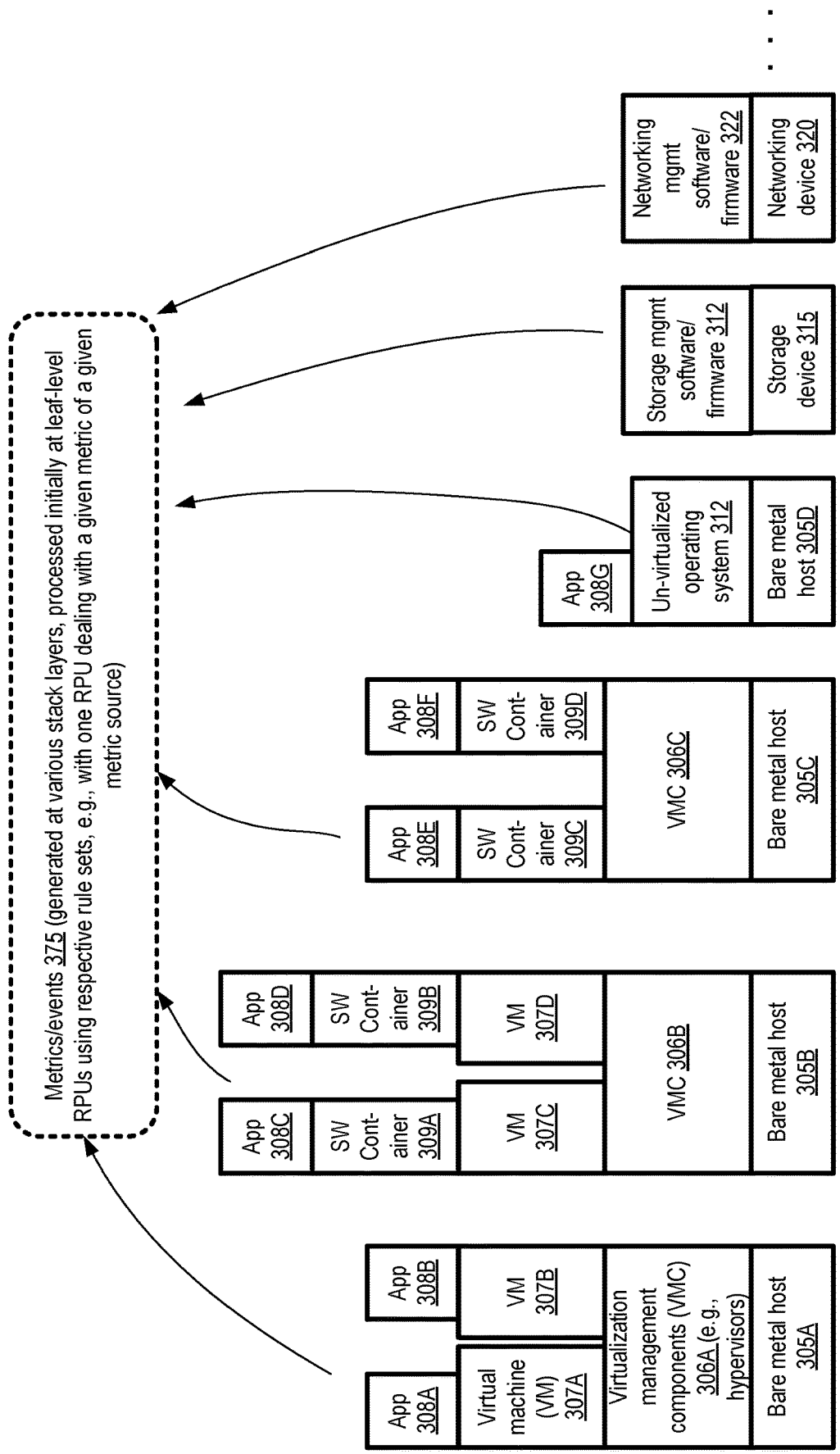
FIG. 3 illustrates examples of hardware devices and associated software components from which metrics may be obtained at rule processing units, according to at least some embodiments.

As suggested in the discussion regarding FIG. 2, a wide variety of devices may be managed using the evolutionary rule-based techniques discussed above. FIG. 3 illustrates examples of hardware devices and associated software stacks from which metrics may be obtained at rule processing units, according to at least some embodiments.

Three types of virtualized computing arrangements are shown by way of example in FIG. 3, each of which may comprise several layers of a stack, with metrics 375 potentially being generated at one or more of the layers for processing at RPUs. In some cases, the stack may comprise a bare metal host 305A on which one or more virtual machines (VMs) such as 307A and 307B may be instantiated with the help of virtualization management components 306A. Virtualization management components (VMCs) such as 306A, may, for example, comprise a hypervisor running on the CPU(s) of the host 305A, and/or one or more peripheral devices to which networking-related and other types of virtualization tasks may be offloaded from the CPUs in some embodiments. A number of applications such as 308A or 308B may be run at the virtual machines 307A or 307B in the depicted embodiment. In some cases, a single-tenant mode of virtualized computing may be implemented, in which all the virtual machines running on a host are instantiated on behalf of a single client of a virtualized computing service. In other cases, a multi-tenant mode may be implemented for at least some hosts, in which case it may be possible for virtual machines of several different clients or customers to share the same host.

In a second approach towards virtualization, shown in the stack associated with host 305B, one or more software containers 309 (such as 309A or 309B) may be instantiated using a given virtual machine (such as 307C or 307D) established with the help of a VMC 306B, and applications 308 (such as 308C or 308D) may be run within the software containers. Software containers may provide another level of application isolation, beyond the isolation being provided by the underlying virtual machines in the depicted embodiment. In a third approach towards virtualization shown with respect to bare metal host 305C, software containers such as 309C or 309D may be instantiated directly on top of a VMC 306C, without intermediary virtual machines, and applications such as 308E or 308F may be run using the containers.

In at least some embodiments, un-virtualized hosts such as 305D may be among the devices managed using the resource management techniques; for example, metrics may be collected from operating systems 312 running on the bare metal host 305D, and/or from applications such as 308G running at the operating system 312. (It is noted that in various embodiments, virtual machines 307 and/or software containers 309 may also comprise respective instances of operating systems, not shown in FIG. 3.)

In addition to computing platforms set up using hosts, in at least some embodiments RPUs may also collect and response to events and metrics from various types of storage devices 315, networking devices 320 and the like. As shown, such devices may comprise their own software/firmware layers (such as storage management software/firmware 312 or networking management software/firmware 322) which may interact with RPUs. Events may be detected (e.g., metrics of various kinds may be collected) at any of the layers of the different types of devices shown in FIG. 3 in various embodiments, and rule sets deployed at the RPUs of the RMS may be applied to such events. As such, a wide variety of rule sets may be created at the RMS, some dealing with firmware-level events, others dealing with system software layer events, others dealing with application-layer events, and so on.

Example Rule Set and Timeline

Figure 4:
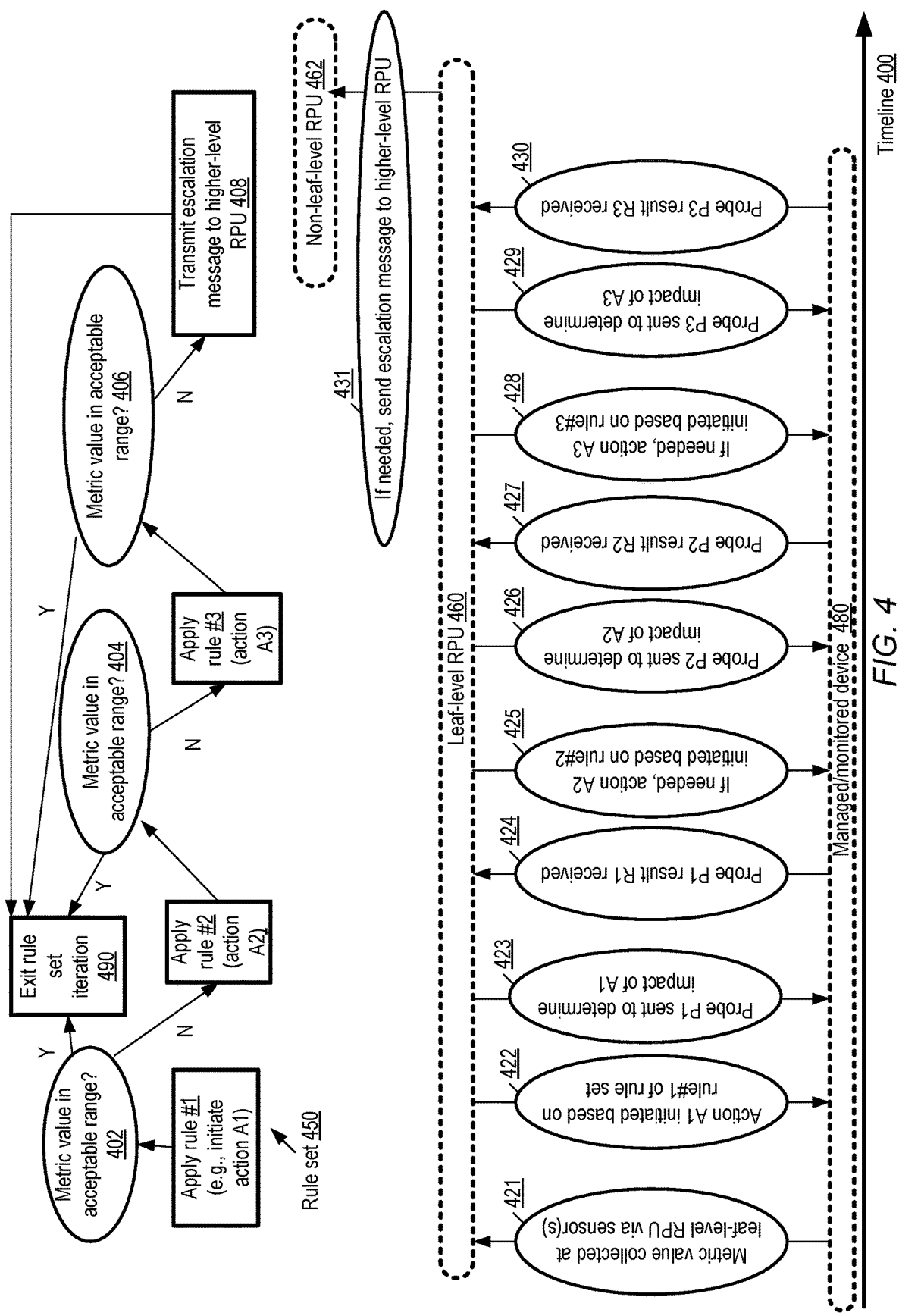
FIG. 4 illustrates an example rule set which may be implemented at a rule processing unit, and a timeline of associated events, according to at least some embodiments.

FIG. 4 illustrates an example rule set which may be implemented at a rule processing unit, and a timeline of associated events, according to at least some embodiments. As shown, rule set 450, enforced at a leaf-level RPU, may comprise a sequence of three rules (labeled rule #1, rule #2 and rule #3) associated with a particular metric in the depicted embodiment, with the execution of the second and third rules conditioned on the cumulative results of earlier rules of the sequence. Such sequences may also be referred to as rule chains in at least some embodiments.

During a particular iteration of the execution of rule set 450, an initial value of the metric may be obtained, and the first rule of the set (rule #1) may be applied to the initial value. For example, if the metric does not meet one or more acceptance criteria, an action A1 may be initiated. If, after the application of rule #1, the metric value returns to a stable or acceptable range (as detected in element 402), the rule set execution iteration may be exited as indicated in element 490. Otherwise, rule #2 may be triggered, which may result in another action A2. If, after the application of rule #2, the metric returns to an acceptable range (as detected in element 404), no more rules need be applied and the rule set may be exited. If A2 also fails to stabilize the value of the metric, rule #3 may be applied, resulting in a third action A3. If A3 succeeds in stabilizing the metric value (as detected in element 406), the rule set iteration may be considered complete; otherwise, an escalation message may be transmitted to a higher-level RPU as indicated in element 408 before the iteration is completed. It is noted that the number of rules may vary from one rule set to another in various embodiments.

Timeline 400 provides another view (at a slightly higher level of detail) of a sequence of operations which may be performed in accordance with rule set 450 in the depicted embodiment. First, a metric value may be collected at an RPU 460 from a managed/monitored device 480 via one or more sensors (element 421). Action A1 may be initiated by the RPU 460 based on evaluating the metric based on rule #1 of the rule set, as indicated in element 422. After some delay (whose duration may be indicated in the rule set), a probe message or request P1 may be sent from the RPU 460 to the device 480 (element 423). The result R1 of P1 (e.g., an updated value of the metric) may be obtained at the RPU (element 424). If needed, in accordance with the evaluation of the result R1 using rule #2, action A3 may be initiated by the RPU (element 425). Another probe may be transmitted to device 480 (element 426), and its result R2 may be received (element 427). R2 may be processed according to rule #3, and action A3 may be initiated if necessary (element 428). A third probe P3 may be transmitted at some time after A3 is initiated (element 429). After its result R3 is received (element 430), a decision may be made at leaf-level RPU 460 as to whether to send an escalation message to a higher-level RPU (element 431), such as non-leaf-level RPU 462 in the depicted embodiment.

It is noted that although a sequential rule set is shown by way of example in FIG. 4, in at least some embodiments multiple rules, events and/or messages may be processed in parallel at various levels of an RPU hierarchy. For example, at a non-leaf level RPU, multiple messages from lower and/or higher layers may be received asynchronously with respect to one another, and at least some of the corresponding processing may be performed concurrently or near-concurrently. In some cases, the response to a given metric value may include multiple responsive operations which may be performed at least partially in parallel, which in turn may lead to additional rules being applied in parallel.

Machine Learning for Rule Modifications and Configuration Changes

Figure 5:
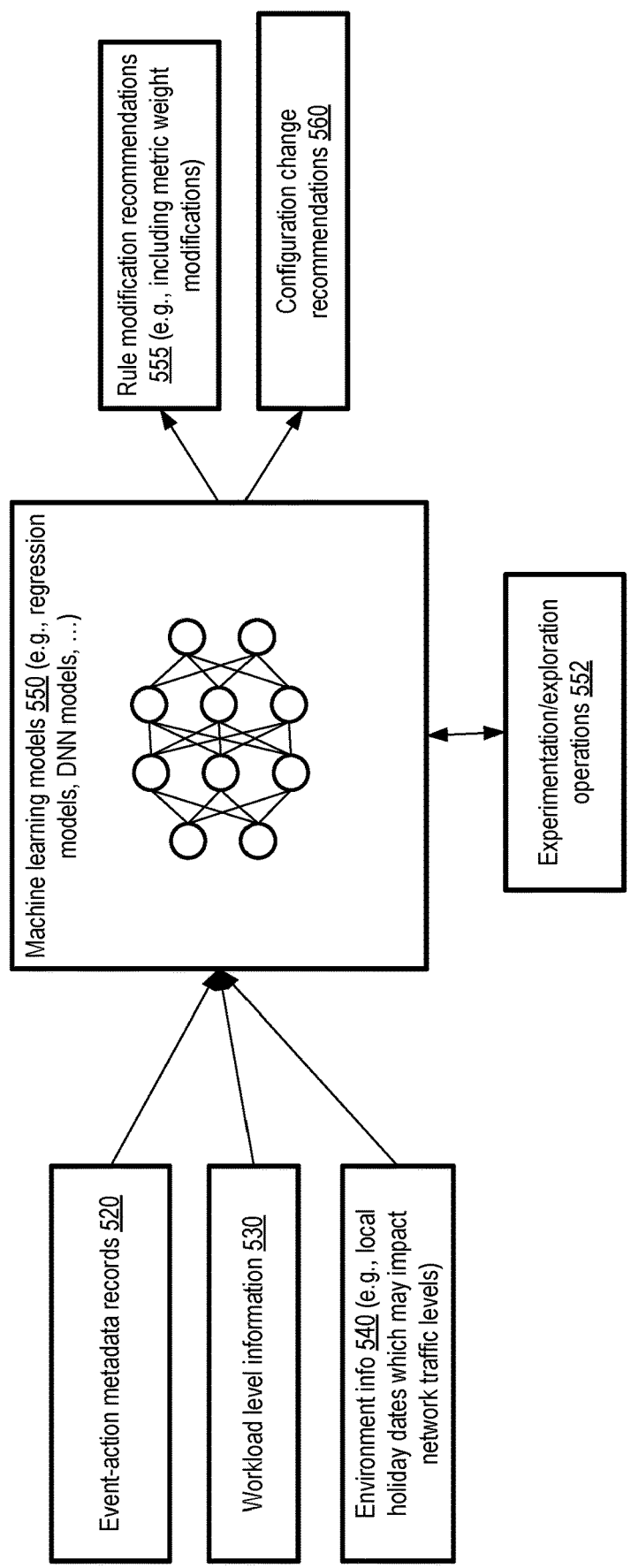
FIG. 5 illustrates example aspects of the use of machine learning models to identify potential enhancements to resource management rules and configurations, according to at least some embodiments.

FIG. 5 illustrates example aspects of the use of machine learning models to identify potential enhancements to resource management rules and configurations, according to at least some embodiments. As indicated earlier, in various embodiments, respective sets of metadata may be generated in response to various events at the RPUs of the resource management system, and stored at a repository accessible to the event-action analyzers of the analytics subsystem. Various types of machine learning models 550 may be trained using data sets that comprise portions or all of the event-action metadata records 520 in the depicted embodiment, including for example regression models, time series models, deep neural network models, and the like. In addition to the event-action metadata records 520 generated by RPUs, in some embodiments, other types of input data may be used for training the models, such as workload level information 530 (e.g., the provisioned or permitted throughputs of various types of service requests at various managed resources), environment information 540 (e.g., indicating on which dates various local holidays occur, which may in turn influence expected traffic and workloads at the managed computing devices) and so on. A number of different types of experimentation and exploration operations 552 may be performed using the machine learning models, including for example blue/green configuration testing, A/B testing and the like.

Outputs of the machine learning models 550 may comprise, for example, rule modification recommendations 555, such as proposed changes to the weights applied to different metric value ranges in RPU rule sets in the depicted embodiment. In addition, in some embodiments, configuration change recommendations 560 (e.g., recommendations to increase or reduce the number of servers in a managed pool of servers being used for an application, or recommendations to increase or reduce the number of threads running within some set of processes) may be identified using the machine learning models.

Evaluation of Proposed Rule Modifications

Figure 6:
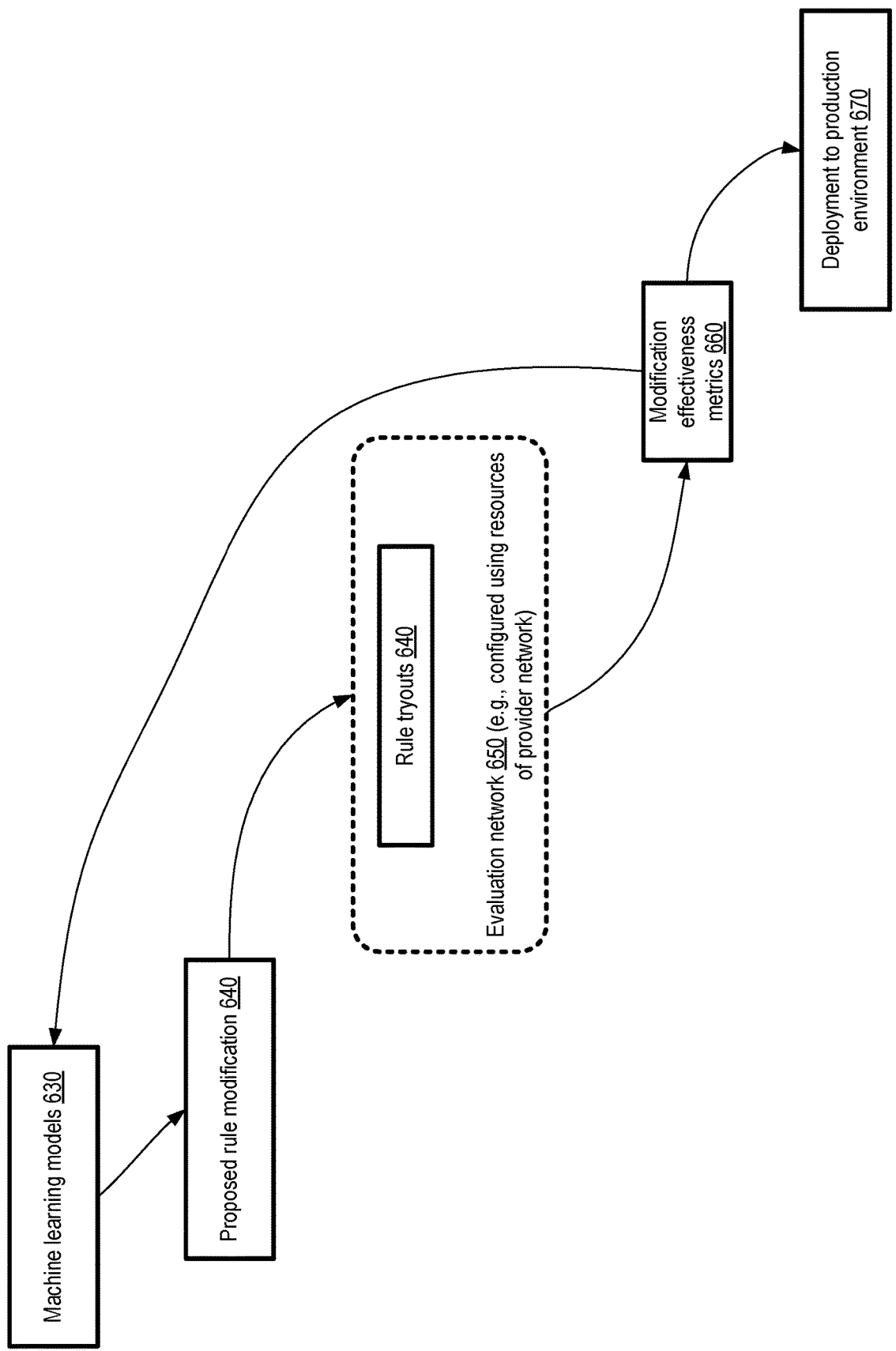
FIG. 6 illustrates an example use of resources of an evaluation network to verify the effectiveness of rule modifications prior to deployment, according to at least some embodiments.

Before deploying changes to rule sets within production environments, in some embodiments the resource management system may utilize a dedicated set of resources to ensure that the rule changes do not have significant unforeseen negative consequences. FIG. 6 illustrates an example use of resources of an evaluation network to verify the effectiveness of rule modifications prior to deployment, according to at least some embodiments.

As shown, a proposed rule modification 640 may be identified using machine learning models 630 (whose input may comprise event-action metadata sets generated by RPUs) in the depicted embodiment. An evaluation network 650 (which may for example comprise computing resources of a virtualized computing service similar to VCS 203 of FIG. 2, and/or networking and storage devices similar to those managed devices to which the rule modification is to be applied) may be utilized to run a set of tests. Such rule tryout tests 640 may, for example, involve applying the proposed rule changes under a test workload which emulates the production environment workload and collecting metrics from the tested devices. In some embodiments, stress tests in which the workload levels exceed those typically observed in the production environment may be employed. A/B tests or blue/green environment tests may be conducted in at least one embodiment using various subsets of the evaluation environment.

If the modification effectiveness metrics 660 obtained from the evaluation network are satisfactory, the deployment 670 to the production environment may be initiated in the depicted embodiment. Otherwise, the proposed rule modifications may be rejected. In at least some embodiments, the modification effectiveness metrics 660 may be fed back to the machine learning models, and may be used to help improve the quality of the recommendations generated.

Event Identifiers

Figure 7:
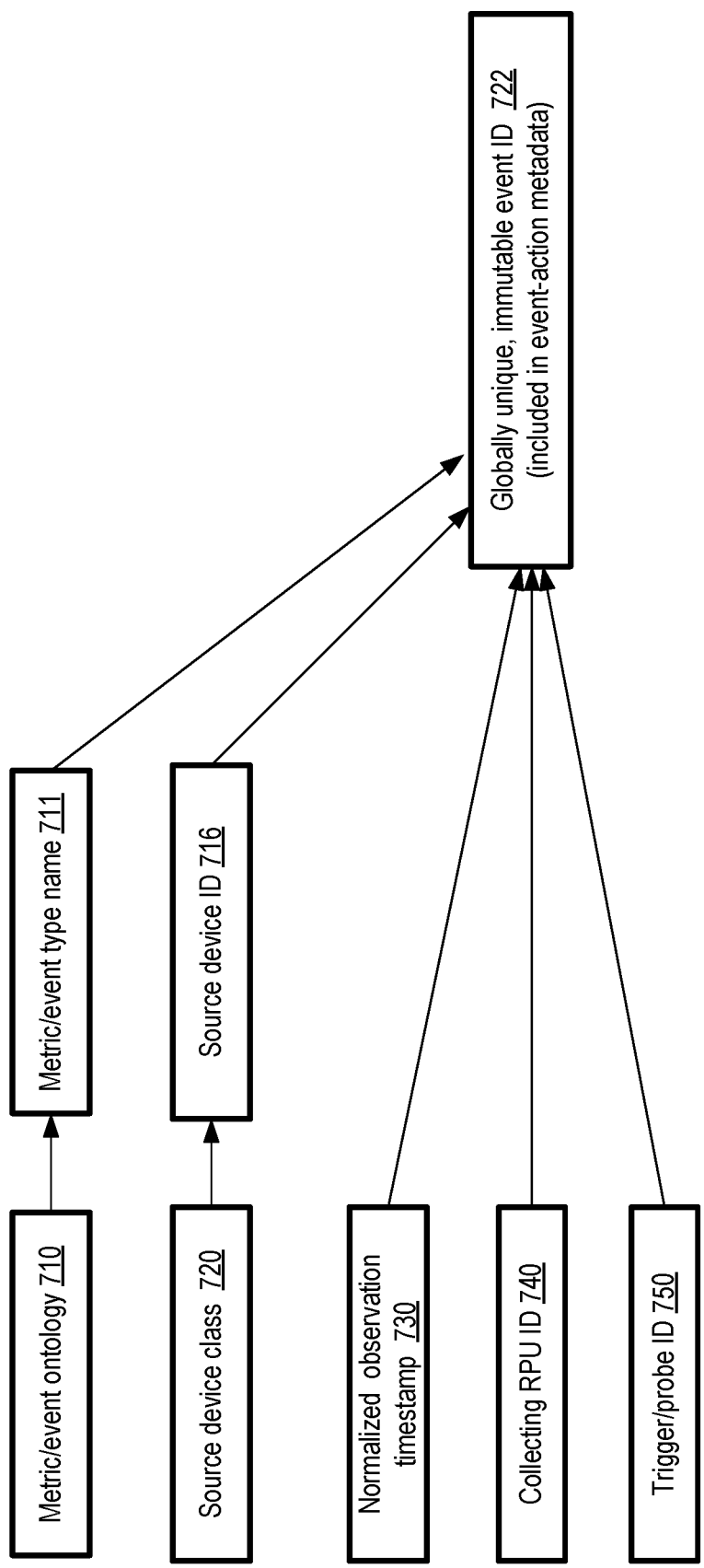
FIG. 7 illustrates examples of factors which may be taken into account to generate unique immutable event identifiers at a resource management system, according to at least some embodiments.

As mentioned earlier, observations may be collected from a wide variety of hardware and software entities at the RPUs of a resource management service. In order to simplify analysis of the metadata generated by RPUS dealing with events generated at widely different types of sources, a normalization methodology may be used in some embodiments to ensure that events are labeled in a uniform manner regardless of the source from which the events are detected. FIG. 7 illustrates examples of factors which may be taken into account to generate unique immutable event identifiers at a resource management system, according to at least some embodiments.

In the depicted embodiment, an ontology 710 may be defined or specified at the resource management service, indicating the types of all the different kinds of metrics or events that are to be handled. The ontology specification may be modified over time, as new types of devices and applications are added to the managed device fleet, and as older devices and applications are removed from the managed device fleet. The ontology may define hierarchical or containment relationships among various groups of events in various embodiments. In some embodiments the event ontology may indicate various classes 720 of devices which are part of the fleet.

In accordance with the ontology 710, a metric/event type name 711 may be identified at an RPU for a particular event that has been detected in the depicted embodiment. In addition, a source device identifier 716 based on a source device class 720 may be determined for the particular device at which or from which the event was detected. In at least some embodiments, a globally unique immutable event identifier 722 may be generated based at least in part on the event type name 711, a source device identifier 716, and a normalized observation timestamp 730. The normalized timestamp may, for example, comprise the number of nanoseconds or milliseconds elapsed since some selected zero time (e.g., 12:00:00 am GMT on Jan. 1, 2000), so that information about the relative timing of different events collected at various geographical locations can be compared without having to take time zones into account. In at least one embodiment, an identifier 740 of the RPU at which the metric is collected, and/or a trigger or probe identifier 750 (if a probe was used to obtain the metric) may also be used when generating the immutable event ID 722. Event identifiers 722 may be included in the metadata generated at the RPUs for eventual analysis at the analytics subsystem of the resource management service in various embodiments. The use of a standardized technique for labeling events, similar to the approach suggested in FIG. 7, may help achieve the goals of generating unique and distinguished identifiers. The uniqueness of the event identifiers may be especially useful in various embodiments in reducing or eliminating noise or ambiguity in the input used for machine learning models at the analytics subsystem, thereby improving the quality of the recommendations generated. In addition to the event identifier, various other elements may be included in the metadata in various embodiments, such as for example the value of a collected metric, an identifier of a rule set associated with the collection of the metric, and so on.

Methods for Resource Management

Figure 8:
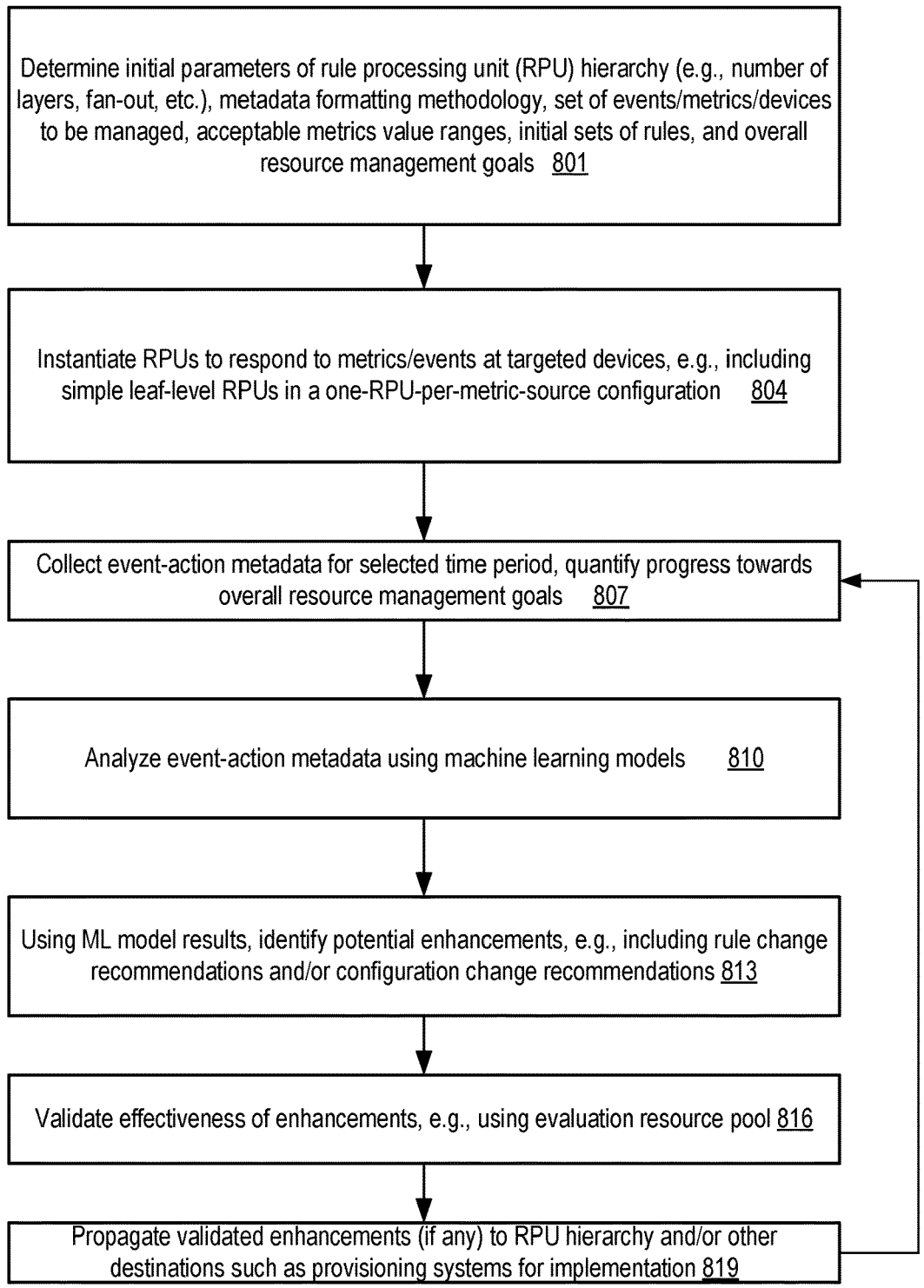
FIG. 8 is a flow diagram illustrating aspects of high-level operations that may be performed at a self-organizing resource management service, according to at least some embodiments.

FIG. 8 is a flow diagram illustrating aspects of high-level operations that may be performed at a self-organizing resource management service, according to at least some embodiments. Before the service is activated for the first time for a given fleet of managed devices, various initial parameters of the service may be identified in the depicted embodiment (element 801). The parameters may include the number of layers of the rule processing unit hierarchy, the fan-out at the different layers of the hierarchy, and the metadata formatting methodology to be used at the RPUs. In addition, the set of events, metrics and devices to be managed, the acceptable ranges of metrics values according to an initial set of rules, and the overall resource management goals may be identified in various embodiments. The overall goals may include, for example, reducing downtime for applications or devices from their current level by X %, reducing customer complaints regarding application performance by Y %, and so on. In some embodiments, continuous improvement goals may be used—that is, if a reduction of X % in downtime is achieved, a further reduction of and additional X % may be targeted, and so on. Since the resource management service may be designed to gradually improve itself based on analysis of metadata indicating events and actions, some of the initial parameter values may be set without expending a great deal of effort in various embodiments.

After the initial parameters are identified, a collection of RPUs may be instantiated to respond to the metrics/events at targeted devices (element 804). The collection may, for example, include relatively simple leaf-level RPUs in a one-RPU-per-metric-source configuration, as well as more complex non-leaf-level RPUs. The rule sets to be implemented may be transmitted to the various RPUs, and the iterative process of collecting observations and responding to the observations based on the rule sets may be begun. As discussed earlier, metadata records indicative of events and corresponding actions may be generated at the RPUs and deposited into a repository from which they may be accessed by event-action analyzers of an analytics subsystem of the resource management service.

Operations of the resource management service may be optimized iteratively in various embodiments. In a given iteration, event-action metadata may be collected for some time period, and the progress made towards the overall resource management goals since the last iteration may be quantified (element 807). Assuming that further progress towards the goals is still feasible and desired, the event-action metadata may be analyzed using one or more machine learning models at the analytics subsystem (element 810). Using the results of the machine learning models, potential enhancements such as rule change recommendations and/or configuration change recommendations may be identified (element 813). Rule change recommendations may, for example, comprise assigning or modifying conditional weights associated with various metrics or escalation messages, adding or modifying corrective actions to be taken, modifying the delays between the applications of various rules, and so on. Configuration change recommendations may include, for example, adding or removing RPUs at various RPUs, changing the permitted message flows in various parts of the RPU hierarchy, and/or modifying the hardware or software configurations of one or more of the computing devices being managed using the RMS in various embodiments.

In at least some embodiments, before deploying at least some of the rule changes and/or configuration changes to a production environment, their effectiveness may be validated using resources of an isolated or dedicated evaluation resource pool (element 816). After validating a given enhancement recommendation, directives to implement the enhancement may be propagated to the appropriate portions of the RPU hierarchy and/or to other destinations such as a resource provisioning system (from which new resources may be acquired for the managed fleet based on recommended configuration changes as needed) in various embodiments. Operations corresponding to elements 807 onwards may then be repeated in the next iteration of the self-organized optimization of the resource management service in the depicted embodiment.

Figure 9:
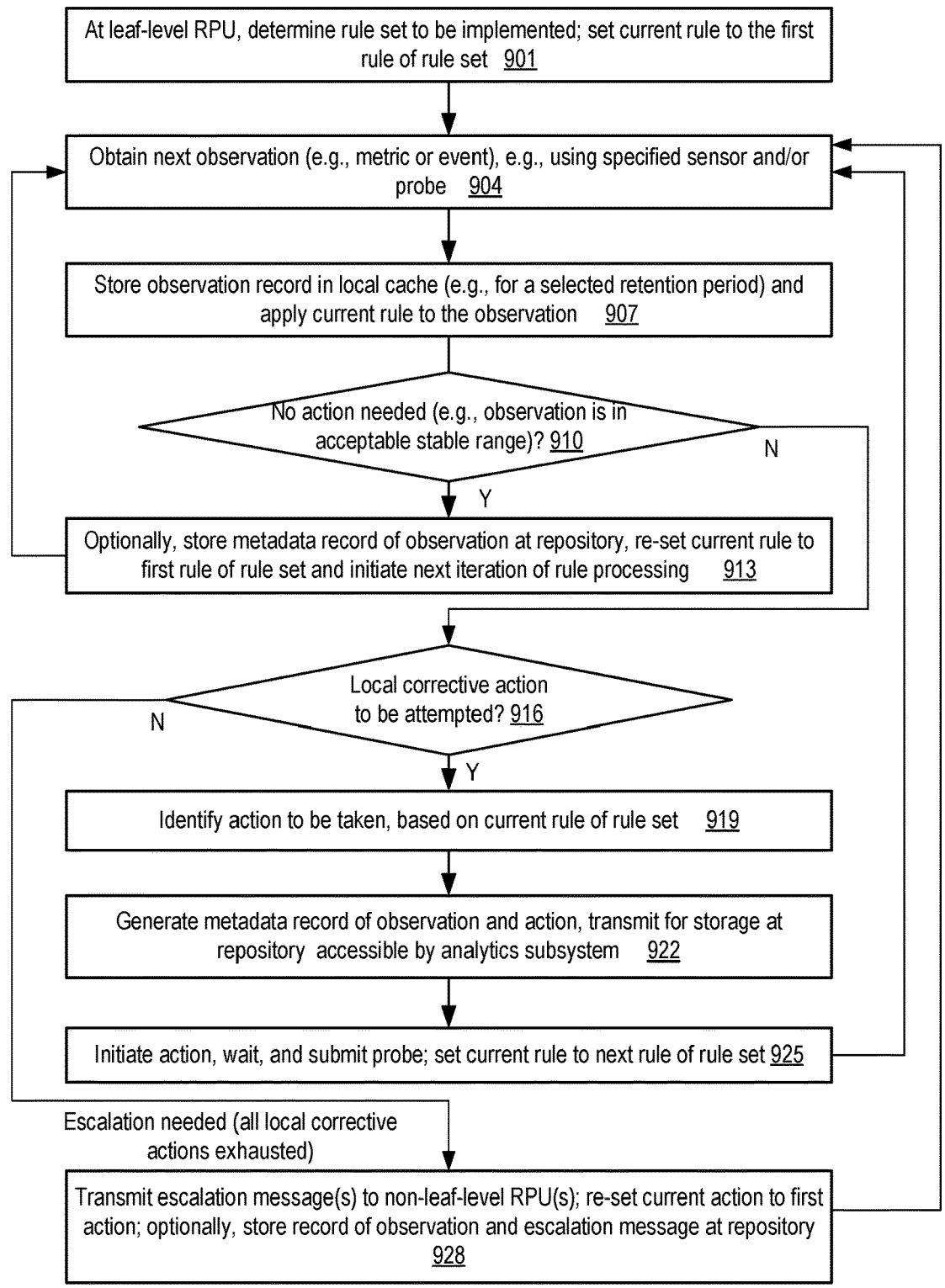
FIG. 9 is a flow diagram illustrating aspects of operations that may be performed at leaf-level rule processing units of a resource management service, according to at least some embodiments.

FIG. 9 is a flow diagram illustrating aspects of operations that may be performed at leaf-level rule processing units of a resource management service, according to at least some embodiments. A shown in element 901, a rule set whose rules are to be implemented in sequence at the RPU may be identified, and the current rule may be set to the first rule of the set in the depicted embodiment (element 901). The leaf-level RPU may be configured to respond to a particular type of event or metric from a particular source in the depicted embodiment.

The next observation (e.g., a value of a metric, or a record of some other type of event) may be obtained at the RPU from the managed device for which the RPU is instantiated, e.g., using a particular sensor or probe (element 904). In at least some embodiments, a record of the observation may be stored in a local cache of the RPU, e.g., for a selected retention period (element 907) and the current rule may be applied to the observation.

If no action is needed, as may be the case if a collected metric remains within an acceptable or stable range (as detected in element 910), a metadata record indicating the observation may be stored at a repository accessible to the analytics subsystem (element 913). The current rule may be set to the first rule again, and the next iteration of rule processing at the leaf-level RPU may be initiated after some inter-iteration interval. In some embodiments, in addition to the values of some metrics, additional statistical or mathematical measures associated with the metrics may be collected and/or computed at RPUs and included in the metadata records for analysis. For example, first-order and/or higher-order derivatives of the metrics may be obtained and stored in scenarios in which rules and/or actions take the rates at which metrics are changing into account.

If some type of local corrective action is to be attempted (as determined in element 916), the action may be identified based on the current rule (element 919) in the depicted embodiment, A metadata record indicating the observation and the action may be generated and transmitted for storage in the repository accessible to the analytics subsystem (element 922). The action may be initiated, e.g., by sending a command to an actuator component of the managed device at which the action is to be executed in some embodiments. After a delay (which may be specified in the rule) to allow the action to be completed and take effect, a probe may be sent to the managed device to obtain a new observation, and the current rule may be set to the next rule of the rule set (element 925). Operations corresponding to elements 904 onwards may then be repeated for the next observation.

If the local corrective actions have been exhausted (as may be determined in operations corresponding to element 916), an escalation may be needed with respect to the events being monitored at the leaf-level RPU in the depicted embodiment. Accordingly, an escalation message indicative of the exhaustion of the local actions may be transmitted to one or more non-leaf-level RPUs in the depicted embodiment (element 928). The current action may be set to the first action of the rule set, and a metadata record of the observation and the corresponding escalation message may optionally be stored at the repository. The next iteration of rule processing, comprising operations of element 904 onwards, may be begun after the appropriate interval in the depicted embodiment.

Figure 10:
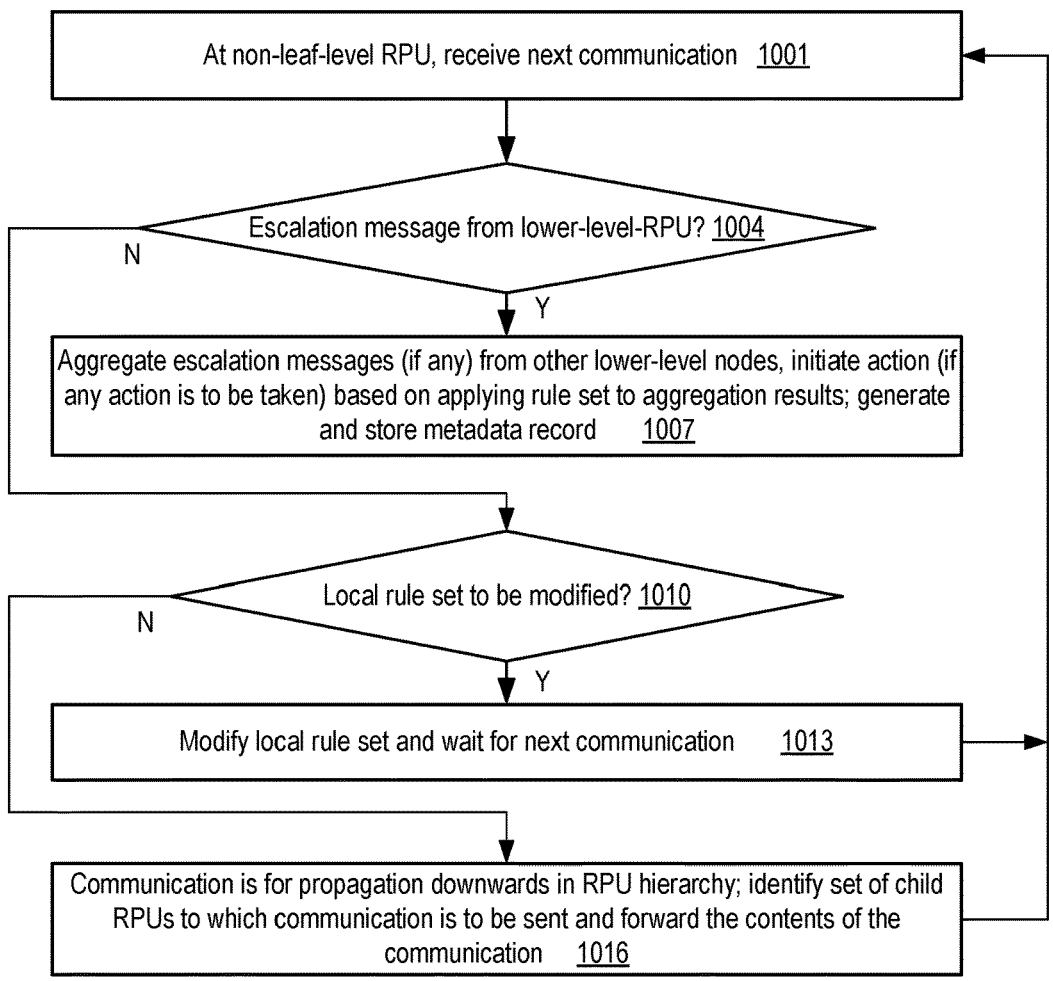
FIG. 10 is a flow diagram illustrating aspects of operations that may be performed at non-leaf-level rule processing units of a resource management service, according to at least some embodiments.

FIG. 10 is a flow diagram illustrating aspects of operations that may be performed at non-leaf-level rule processing units of a resource management service, according to at least some embodiments. In response to receiving a particular communication (element 1001), which may for example be directly from the analytics subsystem, from a higher-level RPU, or from a lower-level RPU, a set of actions dependent on the source and contents of the communication may be initiated.

If the communication is a first escalation message from a lower-level or child RPU of the non-leaf-level RPU (as detected in element 1004) during a particular time interval, in some embodiments, based on the rule set deployed, the receiving RPU may wait for the interval completes before taking any additional action. For example, as shown in element 1007, the receiving RPU may accumulate additional communications (if any) from lower-level RPUs received during the interval, aggregate the information contained in the communications, and then apply the rule set to the aggregated information to determine whether any responsive action is to be taken. If such an action is identified, the action may be initiated in the depicted embodiment, e.g., by transmitting a directive to one or more child RPUs, and/or by transmitting a new escalation message to the parent RPU of the non-leaf-level RPU (if a parent RPU exists). In various embodiments, a set of metadata records indicating the received communications and the actions (if any) may be generated and stored at the repository accessible to the analytics subsystem by the non-leaf-level RPU.

In some embodiments, one of the types of communications that may be received at a non-leaf-level RPU may comprise a recommended rule change for the non-leaf-level RPU itself. If the communication comprises such a recommended modification (as detected in element 1010), the local rule set may be modified accordingly (element 1013) and the non-leaf-level RPU may wait for its next communication.

A third type of communication may result in the non-leaf-level RPU acting as a forwarding agent, e.g., for a message intended for some number of lower-level RPUs. As indicated in element 1016, the set of child RPUs to which the communication should be sent may be identified (e.g., based on the contents of the communication, which may explicitly specify the destinations or paths to the destinations, and/or based on the rule set of the non-leaf RPU), and the communication may be transmitted to the child RPUs. The operations shown in element 1001 onwards of FIG. 10 may be repeated for various newly-received communications in the depicted embodiment.

It is noted that in various embodiments, some of the operations shown in FIG. 8, FIG. 9 or FIG. 10 may be implemented in a different order than that shown in the figure, or may be performed in parallel rather than sequentially. Additionally, some of the operations shown in FIG. 8, FIG. 9 or FIG. 10 may not be required in one or more implementations. Operations not shown explicitly in FIG. 8, FIG. 9 or FIG. 10 may be performed at the corresponding components of the resource management service in some embodiments—e.g., operations in which communications are propagated to a selected set of peer RPUs at the same level as the receiving RPU may be implemented in some embodiments.

Use Cases

The techniques described above, of employing a hierarchy of rule processing units for responding quickly to system perturbations, and gradually evolving the rules used in the hierarchy using machine learning techniques, may be useful in a variety of scenarios. Many large computing environments may include millions of devices collectively implementing complex mission-critical applications, with individual ones of the devices potentially generating hundreds or thousands of metrics per second. The complexity of the computing environment, and the rates at which potentially problematic events may occur in various levels of the environment, may make it very hard for staff of the organizations responsible for maintaining the environment to respond to some events quickly enough to prevent significant application-level problems. In the hierarchical approach towards event processing described, fairly straightforward logic may be used at the lowest levels of the hierarchy to dampen problematic situations rapidly, at rates which may be orders of magnitude faster than if humans were involved in the analysis loop. The rules implemented at the RPU hierarchy may also help reduce or eliminate various types of biases, including cognitive framing biases, filtering biases and/or compression biases which may inevitably influence support staff faced with the task of analyzing vary large amounts of observational data. The use of standardized rules for metadata generation at the RPUs may allow machine learning techniques to be applied to very large sets of disambiguated data records, enabling influential metrics and events as well as the corresponding corrective actions to be identified using offline analysis, without impacting ongoing production operations at the computing environment. The loop of information flowing back and forth between the analytics subsystem and the rule processing hierarchy may enable a self-configuring evolving resource management service to achieve desired system-level goals (such as reductions in downtime, higher levels of application performance and resource utilizations, etc.) more efficiently than in more statically-arranged environments.

Illustrative Computer System

Figure 11:
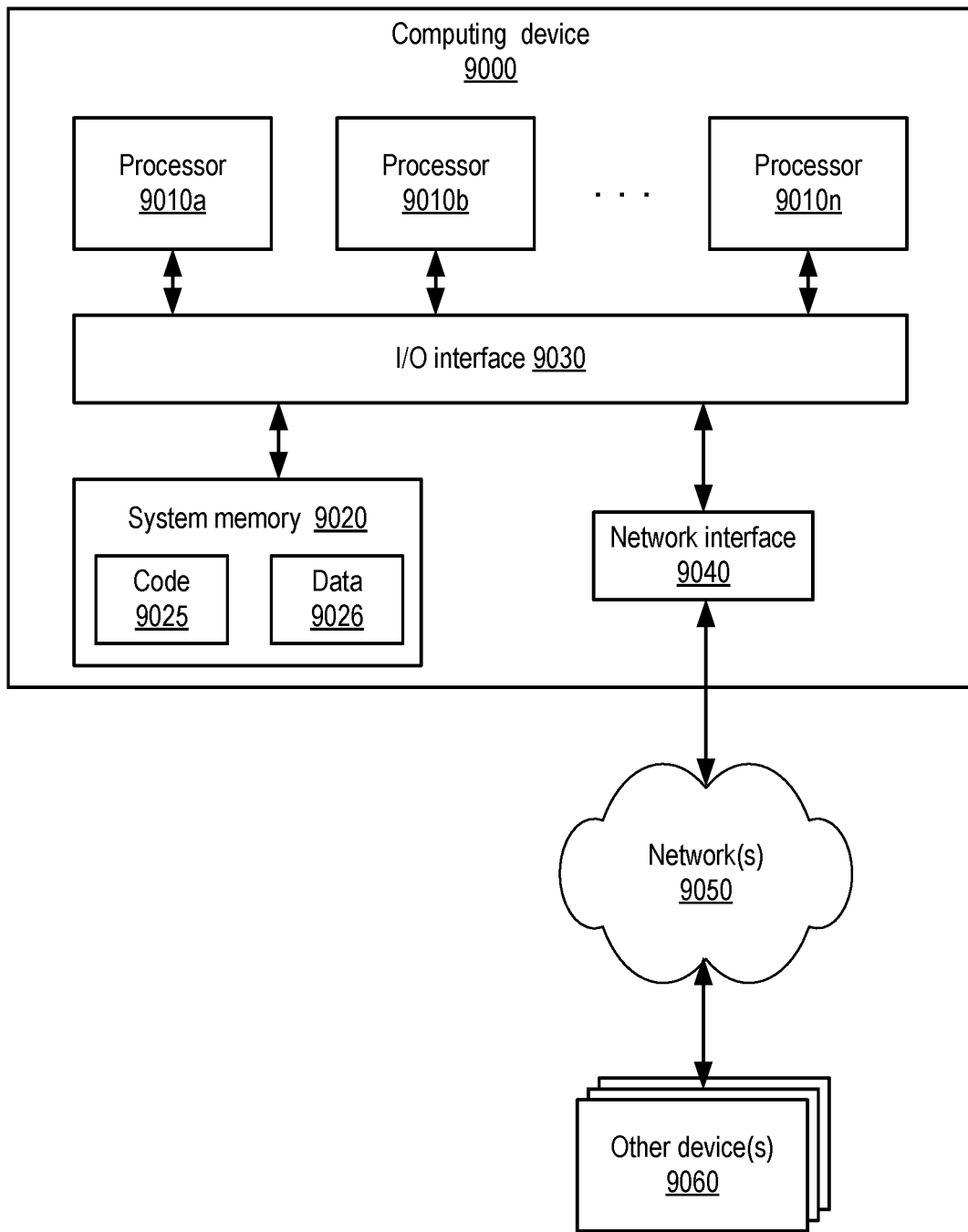
FIG. 11 is a block diagram illustrating an example computing device that may be used in at least some embodiments.

In at least some embodiments, a server that implements a portion or all of one or more of the technologies described herein, including the various components of an resource management service such as resource processing units, event-action analyzers, managed device fleet components and the like may include a general-purpose computer system that includes or is configured to access one or more computer-accessible media. FIG. 11 illustrates such a general-purpose computing device 9000. In the illustrated embodiment, computing device 9000 includes one or more processors 9010 coupled to a system memory 9020 (which may comprise both non-volatile and volatile memory modules) via an input/output (I/O) interface 9030. Computing device 9000 further includes a network interface 9040 coupled to I/O interface 9030.

In various embodiments, computing device 9000 may be a uniprocessor system including one processor 9010, or a multiprocessor system including several processors 9010 (e.g., two, four, eight, or another suitable number). Processors 9010 may be any suitable processors capable of executing instructions. For example, in various embodiments, processors 9010 may be general-purpose or embedded processors implementing any of a variety of instruction set architectures (ISAs), such as the x86, PowerPC, SPARC, or MIPS ISAs, or any other suitable ISA. In multiprocessor systems, each of processors 9010 may commonly, but not necessarily, implement the same ISA. In some implementations, graphics processing units (GPUs) may be used instead of, or in addition to, conventional processors.

System memory 9020 may be configured to store instructions and data accessible by processor(s) 9010. In at least some embodiments, the system memory 9020 may comprise both volatile and non-volatile portions; in other embodiments, only volatile memory may be used. In various embodiments, the volatile portion of system memory 9020 may be implemented using any suitable memory technology, such as static random access memory (SRAM), synchronous dynamic RAM or any other type of memory. For the non-volatile portion of system memory (which may comprise one or more NVDIMMs, for example), in some embodiments flash-based memory devices, including NAND-flash devices, may be used. In at least some embodiments, the non-volatile portion of the system memory may include a power source, such as a supercapacitor or other power storage device (e.g., a battery). In various embodiments, memristor based resistive random access memory (ReRAM), three-dimensional NAND technologies, Ferroelectric RAM, magnetoresistive RAM (MRAM), or any of various types of phase change memory (PCM) may be used at least for the non-volatile portion of system memory. In the illustrated embodiment, program instructions and data implementing one or more desired functions, such as those methods, techniques, and data described above, are shown stored within system memory 9020 as code 9025 and data 9026.

In one embodiment, I/O interface 9030 may be configured to coordinate I/O traffic between processor 9010, system memory 9020, and any peripheral devices in the device, including network interface 9040 or other peripheral interfaces such as various types of persistent and/or volatile storage devices. In some embodiments, I/O interface 9030 may perform any necessary protocol, timing or other data transformations to convert data signals from one component (e.g., system memory 9020) into a format suitable for use by another component (e.g., processor 9010). In some embodiments, I/O interface 9030 may include support for devices attached through various types of peripheral buses, such as a variant of the Peripheral Component Interconnect (PCI) bus standard or the Universal Serial Bus (USB) standard, for example. In some embodiments, the function of I/O interface 9030 may be split into two or more separate components, such as a north bridge and a south bridge, for example. Also, in some embodiments some or all of the functionality of I/O interface 9030, such as an interface to system memory 9020, may be incorporated directly into processor 9010.

Network interface 9040 may be configured to allow data to be exchanged between computing device 9000 and other devices 9060 attached to a network or networks 9050, such as other computer systems or devices as illustrated in FIG. 1 through FIG. 10, for example. In various embodiments, network interface 9040 may support communication via any suitable wired or wireless general data networks, such as types of Ethernet network, for example. Additionally, network interface 9040 may support communication via telecommunications/telephony networks such as analog voice networks or digital fiber communications networks, via storage area networks such as Fibre Channel SANs, or via any other suitable type of network and/or protocol.

In some embodiments, system memory 9020 may be one embodiment of a computer-accessible medium configured to store program instructions and data as described above for FIG. 1 through FIG. 10 for implementing embodiments of the corresponding methods and apparatus. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computing device 9000 via I/O interface 9030. A non-transitory computer-accessible storage medium may also include any volatile or non-volatile media such as RAM (e.g. SDRAM, DDR SDRAM, RDRAM, SRAM, etc.), ROM, etc., that may be included in some embodiments of computing device 9000 as system memory 9020 or another type of memory. Further, a computer-accessible medium may include transmission media or signals such as electrical, electromagnetic, or digital signals, conveyed via a communication medium such as a network and/or a wireless link, such as may be implemented via network interface 9040. Portions or all of multiple computing devices such as that illustrated in FIG. 11 may be used to implement the described functionality in various embodiments; for example, software components running on a variety of different devices and servers may collaborate to provide the functionality. In some embodiments, portions of the described functionality may be implemented using storage devices, network devices, or special-purpose computer systems, in addition to or instead of being implemented using general-purpose computer systems. The term "computing device", as used herein, refers to at least all these types of devices, and is not limited to these types of devices.

CONCLUSION

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the Figures and described herein represent exemplary embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended to embrace all such modifications and changes and, accordingly, the above description to be regarded in an illustrative rather than a restrictive sense.

What is claimed is:

1. An artificial intelligence-based system for resource management of a network, comprising:
    one or more computing devices comprising one or more processors that implement a collection of rule processing units organized into a plurality of layers, including (a) a leaf layer comprising a plurality of rule processing units and (b) at least one non-leaf layer comprising one or more rule processing units, wherein an individual rule processing unit is implemented at one or more of the one or more computing devices,
    wherein a first rule processing unit of the leaf layer is configured to:
        receive an indication of a first rule set to be implemented at the first rule processing unit in response to observations collected from one or more sensors associated with a particular monitored device of the network;
        apply a rule of the first rule set to a first observation generated by a first sensor of the one or more sensors, wherein application of the first rule results in an initiation of a first corrective action;
        cause a first set of metadata comprising respective indications of (a) the first observation and (b) the first corrective action to be stored at one or more data stores; and
        in response to a determination, based at least in part on a second observation generated by the first sensor after the first corrective action has been initiated, that the initiated first corrective action did not meet a success criterion, transmit an escalation message to at least one rule processing unit at a non-leaf layer that is hierarchically above the leaf layer; and
    wherein the at least one rule processing unit at the non-leaf layer is configured to determine, responsive to receipt of the escalation message from the first rule processing unit of the leaf layer, whether an additional corrective action should be initiated; and
    one or more event-action record analyzers implemented at one or more other computing devices separate from the one or more computing devices that implement the collection of rule processing units, the one or more event-action record analyzers including a first event-action analyzer configured to:
        identify an input data set for one or more machine learning models trained to evaluate rule sets, wherein the input data set comprises a plurality of sets of metadata generated at the collection of rule processing units, including the first set of metadata stored at the one or more data stores by the first rule processing unit of the leaf layer, wherein the first set of metadata is based on the application by the first rule processing unit of the rule of the first rule set to the first observation;
        identify, using the input data set including the first set of metadata obtained from the one or more data stores, and using the one or more machine learning models, one or more rule modification recommendations including a first rule modification recommendation to modify the rule applied to the first observations; and
        cause the first rule modification recommendation to be propagated to one or more rule processing units in the plurality of layers of the collection.

2. The system as recited in claim 1, wherein the particular monitored device comprises one or more of: (a) a host, (b) a virtual machine, (c) a software container, (d) a network device, or (e) a storage device.

3. The system as recited in claim 1, wherein the first observation comprises a value of one or more of: (a) a CPU metric, (b) a storage metric, (c) a network metric, or (d) a metric generated at a software component.

4. The system as recited in claim 1, wherein to determine that the first corrective action did not meet the first success criterion, the first rule processing unit is configured to:
   determine that, subsequent to implementation of the first corrective action, an updated value of a first metric is outside an acceptable range.

5. The system as recited in claim 1, wherein the one or more machine learning models include one or more of: (a) a regression model, (b) a classification model, (c) a time-series model or (d) a neural network model.

6. A method, comprising:
   performing, at a plurality of computing devices:
      applying, at a first leaf-level rule processing unit of a resource management system, a particular rule of a first rule set to a value of a first metric collected at a first leaf-level rule processing unit, wherein application of the particular rule results in an initiation of a first corrective action;
      causing, by the first leaf-level rule processing unit, a first set of metadata comprising respective indications of (a) the value of the first metric and (b) the first corrective action to be stored at one or more data stores;
      in response to determining, based at least in part on an additional value of the first metric collected at the first leaf-level rule processing unit after having initiated the first corrective action, that the initiated first corrective action did not meet a first success criterion, transmitting, by the first leaf-level rule processing unit, an escalation message to at least one other rule processing unit in a non-leaf-level that is hierarchically above the first leaf-level rule processing unit of the resource management system, wherein the at least one rule processing unit at the non-leaf layer is configured to determine, responsive to receipt of the escalation message from the first leaf-level rule processing unit, whether an additional corrective action should be initiated;
      generating, at a first event-action analyzer implemented at one or more of the computing devices separate from one or more of the computing devices that implement the first leaf-level rule processing unit and the at least one other rule processing unit in the non-leaf level of the resource management system, a first rule modification recommendation to modify the particular rule, wherein the first rule modification recommendation is based at least in part on an analysis, using one or more machine learning models, of one or more sets of metadata including the first set of metadata stored at the one or more data stores by the first leaf-level rule processing unit; and
      causing, by the first event-action analyzer, the first rule modification recommendation to be propagated to one or more rule processing units of the resource management system.

7. The method as recited in claim 6, wherein the first metric is generated at one or more of: (a) a host, (b) a network device, (c) a storage device, (d) a software module.

8. The method as recited in claim 6, wherein the first metric comprises a value of one or more of: (a) a CPU metric, (b) a storage metric, (c) a network metric, or (d) a software metric.

9. The method as recited in claim 6, wherein said determining that the first corrective action did not meet the first success criterion comprises:
   determining that, subsequent to implementation of the first corrective action, an updated value of the first metric is outside an acceptable range.

10. The method as recited in claim 6, further comprising performing, by the one or more of the computing devices separate from one or more of the computing devices that implement the first leaf-level rule processing unit and the at least one other rule processing unit in the non-leaf level of the resource management system:
    verifying, using a test configuration, prior to causing the first rule modification recommendation to be propagated, that the first rule modification recommendation meets a second success criterion.

11. The method as recited in claim 6, wherein the first rule set comprises a plurality of rules, and wherein the method further comprises performing:
    receiving, at the first leaf-level rule processing unit, an indication of a sequence in which one or more rules of the plurality of rules are to be applied; and
    applying, at the first leaf-level rule processing unit, the one or more rules in the indicated sequence, prior to determining that the escalation message is to be transmitted.

12. The method as recited in claim 6, further comprising:
    generating, at the first leaf-level rule processing unit in accordance with a metadata formatting methodology, an immutable identifier for the value of the first metric, wherein the immutable identifier includes at least (a) a device identifier of a source device from which the metric was collected (b) a metric type indicator based at least in part on a metric ontology and (c) a collection timestamp for the value; and
    including the immutable identifier within the first set of metadata.

13. The method as recited in claim 6, further comprising:
    analyzing, at a first non-leaf-level rule processing unit of the resource management system in accordance with a first non-leaf-level rule set, one or more escalation messages transmitted by respective rule processing units at lower levels than the first non-leaf-level rule processing unit;
    determining, at the first non-leaf-level rule processing unit, based at least in part on results of analyzing the one or more escalation messages, one or more actions to be implemented at respective leaf-level rule processing units; and
    transmitting, by the first non-leaf-level rule processing unit, directives to implement the one or more actions at the respective leaf-level rule processing units.

14. The method as recited in claim 6, further comprising:
    instantiating, at a particular computing device of the plurality of computing devices, an agent of the resource management system, wherein the agent comprises one or more threads of execution, wherein the agent implements a plurality of rule processing units associated with respective metrics, and wherein the plurality of rule processing units includes the first leaf-level rule processing unit.

15. The method as recited in claim 6, further comprising:
    determining, at the first event-action analyzer using the one or more machine learning models, a conditional weight to be assigned to a particular metric at one or more rule processing units of the resource management system, wherein a first condition associated with the conditional weight is based at least in part on one or more of: (a) a workload level or (b) a network traffic state; and causing, by the first event-action analyzer, the conditional weight to be propagated to the one or more rule processing units of the resource management system.

16. A non-transitory computer-accessible storage medium storing program instructions that when executed on one or more processors cause the one or more processors to implement a rule processing unit of a resource management system, wherein the rule processing unit is configured to:
- apply a particular rule of a first rule set to a value of a first metric collected at the rule processing unit of a leaf layer of the resource management system that comprises a hierarchy of layers, wherein application of the particular rule results in an initiation of a first corrective action;
- cause a first set of metadata comprising respective indications of (a) the value of the first metric and (b) the first corrective action to be stored at a repository, wherein a plurality of sets of metadata of the repository, including the first set of metadata, is used as input to one or more machine learning models distinct from the hierarchy of layers including the leaf layer and a non-leaf layer, trained to generate rule modification recommendations to modify the particular rule for one or more rule processing units of the resource management system; and
- in response to determining, based at least in part on an additional value of the first metric collected at the rule processing unit after having initiated the first corrective action, that the initiated first corrective action did not meet a first success criterion, transmit an escalation message to at least one other rule processing unit implemented on the one or more processors within the non-leaf layer of the resource management system, wherein the non-leaf layer is hierarchically above the leaf layer, wherein the at least one rule processing unit at the non-leaf layer is configured to determine, responsive to receipt of the escalation message from the rule processing unit of the leaf layer, whether an additional corrective action should be initiated.

17. The non-transitory computer-accessible storage medium as recited in claim 16, wherein the first metric is generated at one or more of: (a) a host, (b) a network device, (c) a storage device, (d) a software module.

18. The non-transitory computer-accessible storage medium as recited in claim 16, wherein the first metric comprises a value of one or more of: (a) a CPU metric, (b) a storage metric, (c) a network metric, or (d) a metric generated at a software module.

19. The non-transitory computer-accessible storage medium as recited in claim 16, wherein said determining that the first corrective action did not meet the first success criterion comprises:
- determining that, subsequent to implementation of the first corrective action, an updated value of the first metric is outside an acceptable range.

20. The non-transitory computer-accessible storage medium as recited in claim 16, wherein the rule processing unit is configured to:
- generate a unique identifier for the value of the first metric, wherein the unique identifier includes at least (a) a device identifier of a source device from which the metric was collected (b) a metric type indicator based at least in part on a metric ontology and (c) a collection timestamp for the value; and
- including the unique identifier within the first set of metadata.

* * * * *